United States Patent [19]

Kohut

[11] Patent Number: 4,812,427

[45] Date of Patent: Mar. 14, 1989

[54] CLAY SLURRY

[75] Inventor: William Kohut, Springville, Tenn.

[73] Assignee: H. C. Spinks Clay Company Inc., Paris, Tenn.

[21] Appl. No.: 99,917

[22] Filed: Sep. 22, 1987

Related U.S. Application Data

[63] Continuation-in-part of Ser. No. 895,815, Aug. 12, 1986, abandoned.

[51] Int. Cl.$^4$ .............................................. C04B 33/28
[52] U.S. Cl. .................................... 501/148; 501/146; 106/487
[58] Field of Search ............... 501/148, 146, 149, 147; 106/308 Q

[56] References Cited

U.S. PATENT DOCUMENTS

| | | | |
|---|---|---|---|
| 2,337,597 | 12/1943 | Hall | 501/147 |
| 3,130,063 | 4/1964 | Millman et al. | 106/308 |
| 3,236,666 | 1/1966 | Sawyer | 501/147 |
| 4,061,502 | 12/1977 | Windle | 501/148 |
| 4,182,785 | 1/1980 | Price | 427/361 |

OTHER PUBLICATIONS

"Technical Innovations in Whiteware," edited by J. S. Reed et al. (Alfred University Press, Alfred, N.Y., 1982 [proceedings of the 1981 Alfred Whitewares Conference]), pp. 107–124.

"Advances in Ceramics," vol. 9, Forming of Ceramics, edited by John A. Mangels et al. (The American Ceramic Society, Inc., Columbus, Ohio, 1984), pp. 76–84.

J. Iannicelli, "Grade Structure and Applications of Coating Clays," Pulp & Paper Magazine of Canada, 71, No. 13, T281-T-284, Jul. 3, 1970.

"Kaolin Clays and Their Industrial Uses," (J. M. Huber Corporation, New York, N.Y., 1955), pp. 144–145.

"CWF Kaolin Clay IPD-3-2," A New Kaolin Standard, Huber's CWF for the Latex Compounder and the Textile Industry, (J. M. Huber Corporation, New York, N.Y., 1958[?]) . . . TN 941 H8.

*Primary Examiner*—William R. Dixon, Jr.
*Assistant Examiner*—Ann M. Knab
*Attorney, Agent, or Firm*—Howard Greenwald

[57] ABSTRACT

A blended, stable ball clay/water slurry, wherein:

1. the slurry comprises from about 58 to about 68 weight percent of ball clay, from about 42 to about 32 weight percent of water, from about 50 to about 650 parts per million (by dry weight of ball clay) of soluble sulfate ion, and from about 0.01 to about 1.0 percent of organic polyelectrolyte (weight of active ingredient by weight of dry ball clay) with a molecular weight of from about 1400 to about 6000;

2. the slurry, when freshly made has a five-minute gel viscosity of from about 1,000 to about 10,000 centipoise, a ten-minute gel viscosity of from about 2,200 to about 12,000 centipoise, and a twenty-minute gel viscosity of from about 3,500 to about 14,000 centipoise.

10 Claims, 1 Drawing Sheet

CLAY SLURRY

CROSS REFERENCE TO RELATED APPLICATION

This application is a continuation-in-part of applicant's copending application Ser. No. 895,815 filed Aug. 12, 1986, now abandoned.

TECHNICAL FIELD

A blended, stabilized clay/water slurry is described. This inorganic slurry, which is comprised of from about 58 to about 68 percent of ball clay, can be used to form a casting slip to prepare porcelain whitewares.

BACKGROUND OF THE INVENTION

This background section of the patent application was written by Professor J. E. Funk of Alfred University. This section reflects Mr. Funk's understanding as to some of the phenomena involved in applicant's invention. Although applicant is in agreement with this understanding, he does not wish to be bound to any particular theory with regard as to why this clay/water slurry possesses its unique combination of unexpected, beneficial properties.

Ceramics is sometimes referred to as the second oldest profession known to man, second only to agriculture. Early man left his written records on tablets of clay. The Hebrew Exodus resulted partly from labor problems at Pharoh's Clay Words where bricks were manufactured. Pre-Columbian potters produced food vessels and utensils. Chinese porcelains graced the tables of European nobility. Until the present century, although the technical knowledge of these many potters constantly increased, the production of ceramic articles from clay-based compositions was mostly an art rather than a science. During this century the uses of clays has been expanded within ceramics and beyond to coatings for paper as well as fillers for plastic and rubber products. Even today many producers of complicated ceramics still rely on imperfect and often incorrect knowledge of this technology. However, the science has advanced to the point where the properties of clay-water slurries may now be accurately and consistently controlled to assure uniform performance of these materials in the various manufacturing applications.

Clay has the unique ability to impart plastic properties to a ceramic article due to its crystal structure which immobilizes a layer of water adsorbed onto its surfaces. This adsorbed water is structurally different from free liquid water and is sometimes referred to as "ice-like."

In ceramic applications of clay-water slurries, there are a multitude of properties which must be synergistically controlled in order to assure the consistent performance of the slurry in any specific application. For the purpose of this test the explanation of the properties' synergism will be limited to perhaps its most difficult applications: slip casting. Other applications, such as preparation of bodies for extrusion of electrical porcelain or dinnerware, or for spray drying, require a similar approach but with different parameters.

A casting slip for sanitaryware casting is usually comprised of the following six ingredients.

1. Ball Caly—This provides kaolinite and other minor minerals as the smallest size particles in the body, including the major portion of the colloidal fraction of the assembled particle size distribution. The colloidal matter provides the high surface area necessary to react with the dispersant chemistry and impart plasticity to the green body and high mechanical strength to the dry body. It is the major contributor to the slip rheology, which is a critical measure of process control. Ball clays sometime contain organic matter, which may be converted to alkali humates and thereby provide autodispersion of the clay in water. The theology of the ball clay slurry portion almost alone determines the rheology of the final casting slip. Its natural chemistry and mineralogy also provide important firing and fired properties to the ceramic article.

2. Kaolin—This provides a slightly coarser fraction of kaolinite minerals to the body, modifying the particle size distribution and the behavior of the ball clay. It is more uniform in its crystallography and properties than ball clay, but it is otherwise quite similar to it. It usually fired whiter than ball clay.

3. Feldspar—This is an alkali-alumino-silicate mineral which is used to control the vitrification of the ceramic article during the final firing process.

4. Flint or Silica—This mineral is called a filler, and it further modifies the combined contributions of all of the other ingredients. It also limits the mechanical strength of the ceramic.

These four powders in combination also provide a particle size distribution and specific surface area of the solid fraction of a slip.

5. Water—This provides the vehicle in which the particles of the above four powders are suspended. Water quality is important; the water should not contain an excess of multivalent cations as salts, such as calcium or magnesium.

6. Chemical Additives—They modify the rheology of the slurry and the slip. Monovalent alkali salts, at low concentrations, disperse or deflocculate the particles, reducing the viscosity. Multivalent cationic salts flocculate the particles increasing the viscosity. Formerly these salts were always of the inorganic types. More recently polymeric polyelectrolytes of various types have begun to be used for these purposes.

Slip casting is the process whereby a low viscosity, high solids slip is dewatered in a plaster mold. However, this dewatering must be accompanied by a simultaneous gellation of the colloidal fraction of the particles within the body. These two processes, dewatering and gellation, are both necessary and, in some slips, are frequently opposed to each other. They perform separate functions and, only when balanced in exactly the correct relationship, do they together provide optimum casting behavior.

Dewatering

If a casting slip contains a minimum of colloidal particles and sufficient dispersant to prevent any gellation due to flocculation to occur, the casting rate will depend only upon the thickness of the cast cake at the mold face. As the cast cake thickness increases, the pressure drop across the cake also increases, due to the increased resistance of the longer capillaries, thereby reducing the rate at which the cake continues to thicken. A plot of cast thickness vs. the square root of time will be a straight line with its slope being a measure of the uniform permeability of the cast cake. The equation describing this behavior is of the form:

$$L = (kT)^m$$

wherein (1) L is the thickness of the cast cake, (2) T is the time of cast, (3) k is a constant containing pressure drop, viscosity of the water, porosity of the solid consist, and the density of the particles and slurry, and (4) m is approximately 0.5.

A conventional casting slip usually contains about 50 volume percent solids of which up to about 25 percent are colloidal in size. Compositions made from the above listed ingredients, all of which have a specific gravity of about 2.6, will contain about 25–30 weight percent of water. With the appropriate chemical additions, such a slip will have a low enough viscosity to be easily poured and pumped. The low viscosity is due to the fact that the water content is sufficient to both fill the interparticle pore volume of the powder system when all the particles are in contact and also to separate the particles to let them flow past one another during mixing and pouring. The interparticle separation water provides the additional function of supplying an opportunity for chemical dispersants and flocculants to also affect the particle surfaces and therefore the slip rheology.

Upon pouring the slip into a pourous gypsum mold (made from Plaster of Paris), the capillary suction of the mold (about 25 psi) immediately commences the dewatering process. Because the slip contains a highly crowded particle system, the space between the particles is very small, hindering the rapid flow of water through the particle structure to the mold surface. There is, therefore, a pressure gradient decreasing with distance from the mold face and a water flow gradient associated with the pressure gradient. The tendency is to more rapidly dewater the slip nearest the mold face than farther from the face. removal of this interparticle separation water brings the particles closer together, thus reducing the permeability and the dewatering rate of the cast at the mold face. This in turn reduces the rate of water flow from the unaffected slip to the mold. Therefore there results a nonuniform permeability and nonuniform moisture content across the cake thickness.

If a casting slip is fully deflocculated so that all particles, including the colloids, report as individual particles rather than as flocs, and the water flow rate is initially high, the smallest colloids will tend to migrate with the water through the structure of the larger particles and partially plug the pore structure in the mold itself, further reducing the casting rate and exacerbating the nonuniformity of moisture content across the cake. The faster the flow rate, the larger the particles which may migrate with the water.

Also, if the slip is fully deflocculated as described above, during the time while the slip is relatively quiescent in the mold during casting the largest particles will settle out of the slip. There is, therefore, a double particle instability in the fully deflocculated slip: colloidal migration to mold faces irrespective of direction, and coarse particles settling downward due to gravity. The first effect is commonly seen in cast pieces, filter press cakes, and occasionally in spray dried pellets where the surface concentration of colloids is high and the center of the part contains a high concentration of coarse particles. Such a result usually causes cracks or parting due to the lack of bonding of coarse particles by the colloids. The second effect prevents long time storage or transportation of the slip without constant agitation.

Gellation

Gellation is the development of a gel structure within a slip or slurry associated with flocculation. It provides a yield stress in the slip which must be exceeded before flow can occur. Below that yield stress the slip behaves as an elastic rather than as a fluid material. The gellation provides several very necessary functions:

a. It immobilizes the colloids by flocculation into agglomerates substantially larger than the individual particles, thereby preventing them from migrating with the water as individual particles. The ideal initial rate of gellation must therefore be greater than the initial rate of dewatering. The entire rate of gellation should therefore follow the same power law straight line plot as dewatering but with a slightly higher rate or slope.

b. The enlarged flocs effectively increase the size of the pore channels, decreasing the resistance of the water to flow through the particle structure to the mold face. Clay-based ceramic slips usually have a particle size distribution modulus less than 0.37 which provides that the smallest particles in the distribution completely determine the pore size distribution. The smallest particles in a ball clay are about 10 nm, so the channel diameter connecting the interstitial pores are about 1.5 nm (based upon spherical particle models). Such small capillary diameters would almost completely prevent the movement of water at normal mold capillary suction pressure.

c. The flocs trap water within them, reducing the water content available to the mold for dewatering. This increases the water retention of the cast and the shrinkage of the part. However, this also improves the moisture uniformity across the cast, reducing differential shrinkage and attendant cracking of the piece. The increased shrinkage and higher moisture retention also improve mold release and plastic trim properties of the cast piece.

d. The gel structure is believed to be somewhat continuous throughout the slip, providing the theological yield strength. This yield strength must be sufficient to prevent the settling of the largest particles from suspension.

$$Ty > \frac{2DL(Pp - Psl)g}{3}$$

where Ty is yeild strength, DL is the largest particle in the slurry, Pp is particle density, Psl=slurry density, and g is a gravitational constant. However, producing a yield strength to accomplish particle stability while not greatly decreasing fluidity is very complex. Furthermore, the gel structure which provides the yield strength must not continue to build beyond that needed to accomplish both colloidal lateral stability and large particle downward stability, or the slip will not drain from the mold at the end of the casting period. The yield strength should approach a terminal strength which allows flow under gravity alone.

The development and the type of gellation that occurs in clay-based slips or slurries depends upon the nature of the chemical additives used to adjust viscosity as well as the amount, size, and mineralogy of the colloidal matter in the powder. Unravelling the fundamental cause/effect relationships is similar to sorting out the genealogy of a small country village. Everything is interrelated. This is a subject presently under study, and the end is not yet in sight, but a simplistic picture may be seen now, subject to later revision.

Clay-water slurries or clay based slips may be deflocculated by either inorganic alkali salts or by polymers. The polymers may be either ionic polyelectrolytes or nonionic nonelectrolytes. The alkali salts deflocculate by the mechanism of electrostatic repulsion according to the well known DLVO theory. Polymeric nonionic nonelectrolytes defloccuate by the mechanism of steric hindrance whose magnitude depends upon the molecular weight or the length of the polymer chain, that is, the distance the polymer extends from the powder surface. Polymeric polyelectrolytes probably deflocculate by a combination of electrostatic and seric repulsion, but there is a severe dearth in the technical literature discussing the subject. Flocculation depends upon either electrostatic attraction or the cancellation of repulsion allowing Van derWaal's forces of attraction to dominate the system.

Kaolinite particles are generally hexagonal plates with an aspect ratio width to thickness, of about 10–30/1. The larger faces of these particles are always negatively charged due to the polarization of the oxygen surface atoms, or an internal charged efficiency due to ismorphous substitution of calcium or magnesium for aluminum, or aluminum for silicon within the two basal layers of the mineral. The edges are positive at pH 4, uncharged at pH 8, and negative at pH 12. These charge differences are due simply to the adsorption of solution excess hydronium ions at low pH, excess hydroxyl ions at high pH, and a balance between the two near neutral pH. At low pH, flocculation occurs due to edge-face electrostatic bonding in a structure called, for obvious reasons, a "card-house" structure. This floc structure is quite strong, providing a high yield strength. This is the classical method of flocculating clay slurries and clay based slips. At neutral pH the edges are uncharged, and weak edge-edge bonding provides a fragile "card-pack" floc structure, giving a low yield strength. A high pH both faces and edges provide electrostatic repulsion providing no bonding mechanism, and therefore no structure or yield strength. This is a fully deflocculated system. This classical approach always utilized inorganic salts, such as the sodium salts of silicate, carbonate, phosphate, or hydroxide as deflocculants and calcium, magnesium, or aluminium salts of chloride or sulfate as flocculants.

However, if a substantial fraction of the powder is colloidal in size, the smallest particles may possess sufficient Brownian motion at ambient temperature to overcome the repulsive forces and flocculate within the slurry system. The higher the slurry solids locating for any given article size distribution, the smaller the interparticle spacing, the lower the slurry temperature, and the higher the likelihood of this colloidal auto-floccuation. This always leads to some residual flocculation within the slurry, with its attendant yield stress. That is, a ball clay slurry will always have a yield strength; it is incumbent upon suppliers or users to control it.

Ball clay usually contain some form of lignite as an accessory mineral. Sime lignites, but not all, contain humates whichmay be digested to humic acid or sodium humate, which serves as a secondary organic deflocculant. Neither the structure or chemistry of these humates or their exact contributions to the rheological properties of the slurry is well understood at this time. However, the humates should be classed with the orgnaic deflocculants.

As mentioned above, there exists a dearth in the literature of adequate descriptions of the adsorption of polymeric polyelectrolytes from aqueous solutions onto powders in suspension. However, it seems clear that adsorption occurs by hydrophobic repulsion of the hydrocarbon from the water due to the preference water molecules have for each other compared to hydrocarbons, rather than by any mechanism of attraction of the powder for the polymer. This is especially true when the polymer is anionic and the particle surfaces are also negative. This is called the "hydrophobic effect." Therefore adsorption of these polymers upon powder surfaces would lay the hydrocarbon moiety of the polymer against the partcile with no significant bond between them while leaving the water soluble moiety, whether ionic or not, in the water phase. Assuming this to be the case, the kaolinite particle is no longer the unit of consideration in the development of a structural arrangement within the slurry. The polymeric coating determines the behavior. If the polymer is anionic, the coated particle is electronegative and pH is less important. The ky word in the previous sentence is "less." At high pH the anionic moieties remain negatively charged and repel their neighbors on the same hydrocarbon backbone, thus straightening the polymer to its maximum length. At low pH hydronium ions neutrailize the anionic water-solubel moieties, allowing hydrophobicity to fold the polymer into a ball and minimize its effectiveness. Some steric hindrance may still be active, but its electronegativity has disappeared.

If the polymer is added to a clay slurry prior to the addition of any divalent flocculating salt such as calcium sulfate, the particle coatings will provide both electrostatic and steric repulsion, minimizing the viscosity. Adding the flocculant first may develop a competition between the negative clay surface and the negative polymer moiety for the calcium ion. The sulfate anion is far less influential due to its low charge density per unit volume.

After coating the particles with the polymer, when calcium or magnesium, for example, are added, the divlane tcation may adsorb to the negative sites of polymer on two adjacent particles, providing a bridging structure between the polymer coating on two adjacent particles. This structure is probably substantially lower in strength per unit bond than the structure flocculated by inorganic salts. A lower yield strength is essential to good drain performance at the end of the casting of a sanitary ware article. Concomitant with this characteristic, the rate of development of the yield strength must be higher than the dewatering rate. This beldn of features depends upon the molecular weight and chelating effectiveness of the polymeric dispersant.

The word "analysis" means to "tear apart." In order to understand and control the stability of a slurry or slip, it is necessary to mentally separate it into its constituent parts. There exist at least three separate stabilities which must be measured and controlled in order to be assured that the theological properties of the slurry do not change.

1. Particle Stability a. Migration of colloidal particles to the mold face reduces the casting rate below a predetermined standard. This is measured by the Casting Rate.

b. Sedimentation of the coarsest particles downward due to insufficient yield strength to hold them in suspension increases the solids content of the bottom of a sample under quiescent conditions. This is measured by a Settling Index.

2. Polymer Stability

The optimum condition for polymer stability is presumed to be no more than a monolayer coverage on the powder surface. Excess polymer within the water phase may compete for the bridging cations which develop an optimum gel structure, thereby changing the slurry theology with time. This is measured by the Percent Transmission of the filtrate from the Castng Rate test.

3. Viscosity Stability

There should be very little change in viscosity or in the rate of gellation as a function of time if the above two stabilities are maintained. However, it is the magnitude of the gel structure and its relative strength which determines the particle stability. Changes in both gellation rate and final viscosity after gellation are measured by the Gel Test. The Gel Test is also corroborated by the Brookfield viscosity at 100 rpm and the Flow Test.

SUMMARY OF THE INVENTION

It is an object of this invention to provide a ball clay/water slurry with a unique combination of properties which makes it especially suitable for use in preparing casting slips for porcelain whitewares.

In accordance with this invention, there is provided a blended stable ball clay/water slurry wherein:

1. the slurry comprises froma bout 58 to about 68 weight percent of ball clay, from about 42 to about 32 weight percent of water, from about 50 to about 650 parts per million (by dry weight of ball clay) of soluble sulfate ion, and from about 0.01 to about 1.0 percent of organic polyelectrolyte (weight of active ingredient by weight of dry ball clay) with a molecular weight of from about 1400 to about 6000;

2. the slurry, when freshly made, has a five-minute gel viscosity of from about 1,000 to about 10,000 centipoise, a ten-minute gel viscosity of from about 2,200 to about 12,000 centipoise, and a twenty-minute gel viscosity of from about 3,500 to about 14,000 centipoise;

3. the twenty-minute gel viscosity of a three-day old sample of the slurry is no more than 50 percent greater than the twenty-minute gel viscosity of the freshly made slurry and is from about 3,500 to about 14,000 centipoise;

4. the difference between the twenty-minute gel viscosity of the slurry and its ten-minute gel viscosity is less than about 3,000 centipoise;

5. the difference between the twenty-minute gel viscosity of the slurry and its five-minute gel viscosity is less than about 4,000 centipoise;

6. the slurry has an initial Brookfield viscosity at 100 r.p.m. of from about 100 to about 600 centipoise;

7. from about 30 to about 45 weight percent of the particles in the ball clay are smaller than 0.5 microns, from about 53 to about 69 percent of the ball clay particles are smaller than 2 microns, and from about 70 to about 85 percent of the ball clay particles are smaller than 5 microns;

8. the ball clay has a specific surface are of from about 16 to about 21 square meters per gram;

9. the slurry has a settling index of at least about 0.9, a flow index of from about 20 to about 30 seconds, a casting rate of from about 30 to about 60 grams, its filtrate has an optical transmission of at least about 60 percent, and dry samples made from a slurry have a modulus of rupture of from about 550 to about 700 pounds per square inch; and 10. the ball clay contains from about 50 to about 65 weight percent of silica and from about 20 to about 35 weight percent of alumina, and the silica/alumina weight ratio in the ball clay is from about 2.0 to about 3.0.

BRIEF DESCRIPTION OF THE DRAWING

The present invention will be more fully understood by reference to the following detailed description thereof, when read in conjunction with the attached drawing, wherein like reference numerals refer to like elements, and wherein.

DEFINITIONS OF TESTS AND TERMS USED IN THIS SPECIFICATION

Figure 1:
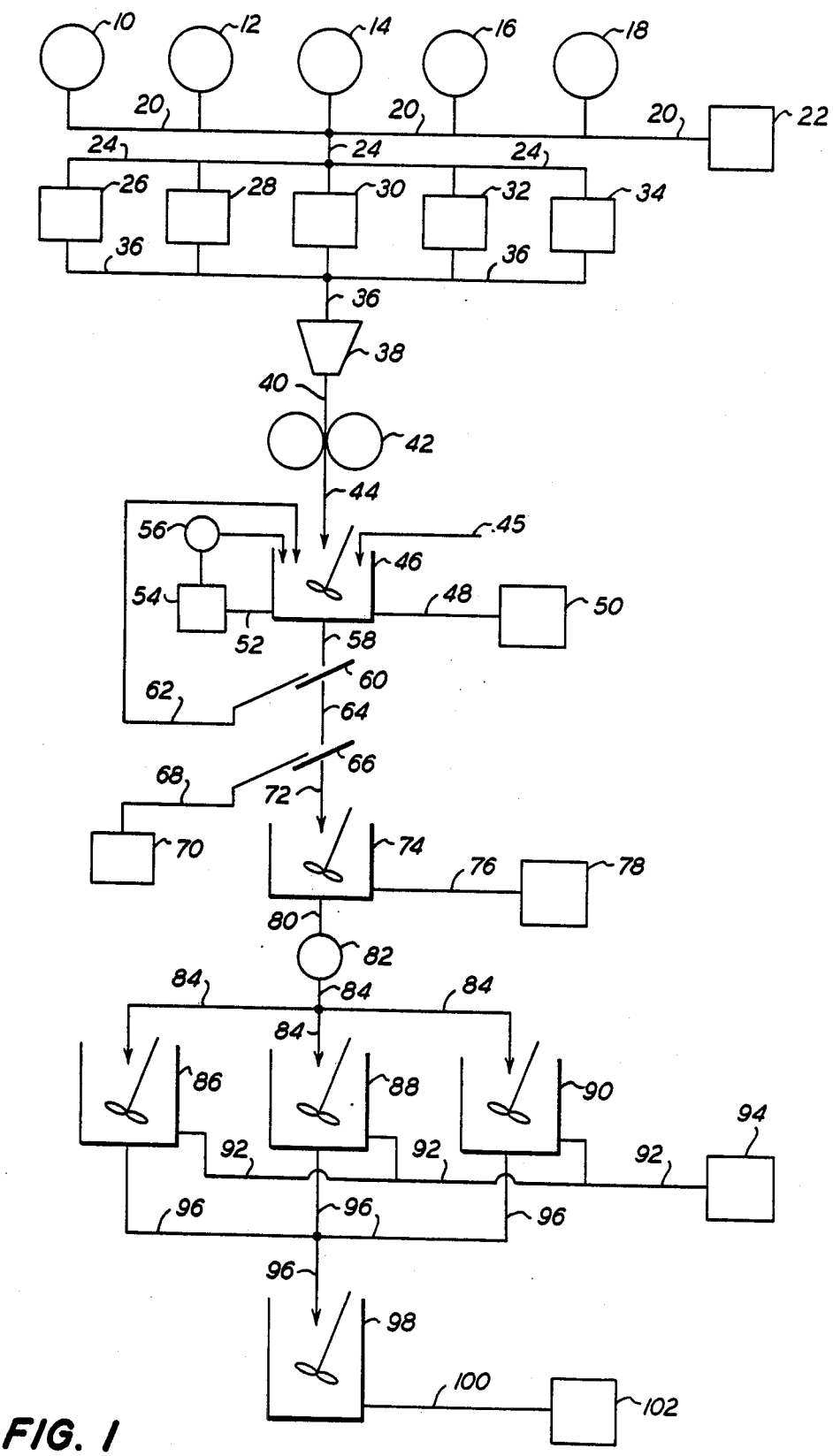
FIG. 1 is a flow sheet illustrating one preferred process for making the ball clay/water slurry of this invention.

The following definitions of tests and terms are provided for a clearer understanding of the invention. Each and every document referred to in this section is hereby incorporated by reference into this specification.

Alumina Content of the Ball Clay

The amount of alumina in the ball clay is determined by atomic absorption analysis, using the Perkin-Elmer Model 2380 Atomic Absorption Spectrophotometer, manufactured by the Perkin-Elmer Corporation of Norwalk, Connecticut. National Bureau of Standards clay standards SRM 98a and 99a are used, and the test is conducted in substantial accordance with the manual for model 2380 entitled "Analytical Methods for Atomic Absorption Spectrphotometry."

In order to put the ball clay into solution for the atomic absorption analysis, a fusion method is used. In this fusion method, the following steps are involved:

1. 0.1 grams of oven-drived clay are placed in a 25 ml. platinum crucible with its cover. 0.5 grams of lithium metaborate are added to the clay and mixed with it with a small glass or polypropylene rod unitl the mixture is relatively homogeneous. Thereafter, the mixture is fused at 1000 degrees centrigrade for from about 10 to about 15 minutes.

2. The crucible is then removed from the oven and allowed to air cool to below red heat. The bottom of the crucible is then quickly quenched in distilled water. The fusion is inspected to insure that there are no signs of pieces of fired clay and that the entire mass is clear.

3. The crucible is then place din a 100 ml. tall beaker. To this is added 60 ml. of hot water, the magnetic stirring bar is dropped in, and stirring is begun. Eitehr 2 ml. of nitric acid or 5 ml. of concentrated hydrochloric acid is added. If nitric acid is used, the solution will remain clear. If hydrochloric acid is used, the solution may have a slightly yellow color.

4. The placement of the magnetic stirring bar may have to be altered several times to effect dissolution of the fusion in the side of the crucible. Dissolution should be complete in about 15 minutes.

Silica Content of the Ball Clay

The silica content of the ball clay is determined by standard elemental oxide analysis for clays, using atomic absorption analysis; the test described in the "Alumina content of the ball clay" definition is equally applicable here. This silica content includes that fraction within the mineralogical structure of the clay minerals themselves as well as teh free quartz minerals associated with the ball clays.

Rational Analysis Using the Mica Convention

When references is made in this specification to one or more minerals in the ball clay, it is to be understood that said concentration is determined by rational analysis using the Mica Convention. This method is described in (1) Holdridge, D. A., "The Mineralogy of Some American (U.S.) Ball Clays," Trans. Brit. Ceram. Soc., V. 62, 857-75, 1963; (2) R. A. Heindl et al., "Kaolins: Effect of Firing Temperatures on Some of Their Physical Properties," B. Stds. J. Res., V. 8, 199-215, 1932; (3) F. H. Norton, "Fine Ceramics: Technology and Applications," Chapters 4 and 5 (McGraw-Hill Inc., New York, 1970), (4) G. W. Phelps, "A Note on Casting Properties of English China Clays," Am. Ceram. Soc. Bull., V. 38, pp. 411-414 (1959); (5) G. W. Phelps, "The Role of Organic Matter in Slip Casting," Am. Ceram. Soc. Bull., V. 29, pp. 55-58 (1950); (6) A. Dinsdale and W. T. Wilkinson, "Mechanical Properties of Whiteware," Proc. Brit. Cerm. Soc., No. 6, 119-136 (1966); and (7) G. W. Phelps et al., "Rheology and Rheometry of Clay-Water Systems," (Cyprus Industrial Minerals Comapny, Sandersville, Ga., 1982), pages 195-198.

Kaolinite Minerals

The kaolinite minerals are described on pages 45-61 of Ralph E. Grim's "Clay Mineralogy" (McGraw-Hill Book Company, New York, 1953)

Mica

As used in this specification, the term mica means muscovite mica, paragonite mica, sericite mica, and mixtures thereof.

Montmorillonite Minerals

The montmorillonite minerals are discussed on pages 55-64 of the aforementioned Grim book.

Ball Clay

The term "ball clay" refers to a secondary clay, commonly characterized by the presence of free quartz, organic matter, high plasticity, high dry strength, long vitrification range, and a light color when fired. This term is defined in A.S.T.M. C-242-72, and it is also discussed on pages 84-86 of Volume 126, No. 1 (January, 1986) of "Ceramic Industry." The essential constituents of ball clay are the hydrated silicates, of which there are several, and which include the kaolinite group and the montmorillnoite group. These minerals have microscopic, plate-like structures.

By way of illustration, "lignitic coarse ball clay" generally contains from about 20 to about 40 pecent (by total weight of dry clay) of particles finer than 0.5 microns, and it usually has a specific surface area of from about 13 to about 18 square meters per gram. This clay usually contains less than about 2.0 percent, by weight of dry clay, of sodium oxide or potassium oxide. The organic matter content of the clay is from about 1 to about 5 percent, and it preferably is from about 1.5 to about 3.5 percent. "Bandy Black" is a lignitic coarse ball clay found in Tennessee.

By way of illustration, "non-lignitic coarse ball clay" usually contains from about 20 to about 40 percent (by total weight of dry clay) of particles finer than 0.5 microns, and it usually has a specific surface area of from about 13 to about 18 square meters per gram. This clay usually contains less than about 3 percent, by weight of dry clay, of sodium oxide or potassium oxide. The organic contant of this clay is usually from about 0.1 to about 1.5 percent, by weight of dry clay. "HC-5" type ball clay is a non-lignitic coarse ball clay found in Tennessee.

By way of illustration, "lignitic fine ball clay" generally contains from about 50 to about 70 percent (by total weight of dry clay) of particles finer than 0.5 microns, and it usually has a specific surface area of from about 20 to about 35 square meters per gram. This clay usually contains from about 0 to about 2 percent (by weight of dry clay) of either sodium oxide or potassium oxide. The organic material content of this clay is from about 0.5 to about 5.0 percent.

Moisture Content of the Ball Clay

Moisture content of the ball clay is determined by test in which 500 grams of clay is weighed, it is then dried for at least 12 hours at a temperature of 105 degrees Centigrade, and it is then weighed again.

Particle Size Distribution

The particle size distribution of the ball clay can be measured in accordance with the following methods:

1. In view of the manner in which clay particles fracture, clay particles will have irregular shapes which, however, are of a body (or maximum side-to-side thickness) such that sub-sieve sized discrete particles will pass through a specified mesh of a sieve. The size of the discrete particles can be expressed in terms of a spherical diameter through which a day particle from a sample of clay or clay/water slurry will pass. One can use U.S. Series sieves down to about 270 mesh or 53 microns.

2. A Micromeritics Sedigraph Model 5000ET (made by the Micromeritics Company, Norcross, Ga. may be used to measure the particle size distribution of the clay material in the ball clay/water slurry. A 0.3 percent solution of "Lomar D" (the sodium salt of a condensed mono naphthalene sulfonic acid sold by Diamond Shamrock Chemical Company of Morristown, New Jersey) can be used. The Lomar D solution is made by weighing 3.0 grams of Lomar D and placing it in a one-liter flask; the flask is then filled up to the mark with distilled water. Approximately 4 grams (dry weight) of ball clay is placed in 50 milliliters of the dilute Lomar D solution and mixed in an English microcup for ten minutes. The slurry is then cooled to 32 degrees Celsius and pumped into the Sedigraph for analysis.

3. Specific surface area can be measured by nitrogen adsorption using the well known BET equation. This measurement can be conducted on a Micromeritics "Flow Sorb II 2300," model 2300/00000/00 (made by Micromeritics Company). The test procedure is described in the instruction manual for this machine (see, e.g., Manual P/N: 230/42804/00, published by Micromeritics in 1985).

4. Wet sieve analysis of ball clay may be conducted in accordance with A.S.T.M. test C-325-81.

Organic Content of the Ball Clay

The test used to determine the amount of organic matter in ball clay involves hydrogen peroxide oxidation. The following equipment is used in this test: (1) an electric drying oven equipped with a thermostat capable of maintaining a temperature of 105 plug or minus 2 degrees Centigrade (a bank of infrared drying lamps may be used), (2) a chemical balance accurate to the fourth decimal place and having a capcity of 50-100 grams, (3) drying dishes, preferably aluminum, with capacities of 50–100 grams of crushed clay, (4) a dessicator capable of holding 6–8, 150 ml. Ehrenmyer flasks, (5) 150 ml. Pyrex glass Ehrlenmyer flasks for oxidation operations, (6) a mortar and pestle, (7) a water bath (like a shallow open aluminum or copper pan) large enough to hold 6–8, 150 milliliter Ehrlenmyer flasks, (8) a hot plate for warming suspensions, (9) a graduate cylinder with 100 milliliter capacity, (10) a 50-mesh testing sieve, (11) a squeeze-type wash bottle, and (12) a bulb pipette for dispensing hydrogen peroxide.

Two reagents are used in the test: deionized or distilled water, and 30 percent hydrogen peroxide. The following procedure is used:

1. Approximately 100 grams of crushed clay are placed in an aluminum dish and transferred to an electric oven at 105 degrees Centigrade for two hours, or placed under infrared lamps for a similar period.

2. The dried clay is then transferred to the mortar and ground sufficiently fine to pass the 50-mesh testing sieve.

3. The screened, dried clay is quartered to a 10 gram lot, from which test samples are to be taken.

4. A marked, clean, dry 150 milliliter Ehrlenmyer flask along with a short-stem funnel is weighed tothe neareast ten-thousandth of a gram on the chemical balance, and the weight is recorded.

5. Dry, ground clay from the 10 gram sample is sifted into the Ehrlenmyer flask unitl approximately two grams have been introduced. The Ehrlenmyer flask, the glass funnel, and the clay are weighed to the nearest ten-thousandth of a gram and the weight is recorded. Duplicate samples are weighed for each clay tested.

6. 25 milliliters of distilled or deionized water are introduced into the Ehrlenmyer flask and the clay sample dispersed by swirling. Where necessary, any clay that may ahve clung to the neck or sides of the flask is washed down by small jets of distilled or deionized water from a wash bottle.

7. Approximately 5 illiliters of 30 percent hydrogen peroxide are introduced into the clay-water suspension, using the bulb pipette.

8. The flask, with funnel in place, is placed on a hot-plate or similar warm surface and the suspension warmed to 50–60 degrees Centigrade. If oxidizable matter is present, a bubbling-fizzing action will be observed.

9. Allow the bubbling to continue until it ceases, indicating exhaustion of hydrogen peroxide or complete extraction of oxidizable organic matter. Add a second 5 milliliter portion of 30 percent hydrogen peroxide. If bubbling-fizzing resumes, there is still organic matter present. Continue alternating hydrogen peroxide addition and warming until an addition of hydrogen peroxide produces no bubbling.

10. The flask, with funnel still in place, is put inside the electric dryer at 105 degrees Centigrade until the water has been completely evaporated.

11. The dried sample is placed in the dessicator until cooled, then weighed as rapidly as possible to prevent errors from readsorbed moisture. The percent organic matter in the clay is calculated by first determining the difference between the weights of the unextracted clay and be extracted clay, dividing this difference by the weight of the unextracted clay, and multiplying the result by 100.

Humic Substance in the Ball Clay Slurry

Although applicant does not wish to be bound to any particular theory, it is believed that, when a ball clay which contains organic matter is digested, one or more humates and/or humic acids are formed from the humus in the clay.

As used in this specification, the term digestion refers to the conversion of the humus fraction of the organic matter in the clay (which is often in the form of lignites) to one or more humates and/or humic acids. This conversion can be effected by adding soda ash and/or sodium hydroxide to hot water and adding clay to the mixture. Reference may be had to a book published by G. W. Phelps et al. entitled "Rheology and Rheometry of Clay-Water Systems" (Cyprus Industrial MineralsCompany, Sandersville, Ga., 1982).

Humus is the dark-colored, organic, well-decomposed soil material consisting of the residues of plant and animal materials together with synthesized cell substances of soil organisms and various inorganic elements. This term is defined in Stokes et al.'s "Glossay of Selected Geologic Terms with Special Reference to Their Use in Engineering," (The Colorado Scientific Socieyt, Denver, Colo., 1955). This term is also discussed in pages 585–588 of volume 6 of the "McGraw-Hill Encyclopedia of Science & Technology" (McGraw-Hill, Inc., New York, 1977).

The digestion of humus converts some or al lof it to humate and/or humic acids. The term humic acid refers to the brown, gelatinous material precipitated by mineral acids from an alkali extract from peat, soil, or other decayed plant materials. The term humate refers to the salt of a humic acid.

Many formulas for problematic humic acids have been proposed. See, e.g., pages 21–97 of a book by S. I. Tomkeleff entitled "Coals and Bitumens and Related Fossil Carbonaceous Substances" (Pergammon Press, Ltd., London, 1954). Humic substances have been described as a series of acidic, yellow-to-black colored, moderately high molecular weight polymers which represent extremely heterogenous mixtures of molecules, ranging in molecular weight from 2,000 to 300,000. Reference may e had to a publication by F. J. Stevenson and J. H. A Butler entitled "Chemistry of Humic Acids and Related Pigments," Inorganic Geochemistry, Eglinton, G., and Murphy, M. T. J., editors, Springer-Verlag, Berlin, Heidelberg, 1969, Chapter 22.

Organic Polyelectrolyte in the Ball Clay Slurry

The term organic refers to a composition which contains the element carbon and which contains or is derived from one or more hydrocarbon radicals. The term polyelectrolyte refers to a polymer which can be changed into a molecule with a number of electrical charges along its length.

In this specification, the concentration of organic polyelectrolyte is described by dry weight of active ingredient in the liquid organic polyelectrolyte, to dry weight of clay in the ball clay slurry. Thus, by way of illustration, "Colloid 211" is an organic polyelectrolyte solution which contains 43% of active ingredient. In a ball clay slurry which contains 1,000 pounds, dry basis, of ball clay, 10 pounds of this polyelectrolyte solution would exist in the slurry at a concentration of 0.43 precent.

Initial Viscosity of the Ball Clay Slurry

The initial viscosity of the ball clay slurry is that viscosity measured one hour after the slurry has been mde. Measurement is made on a freshly stirred slurry with a Brookfield Viscometer, model RVTD, equipped with a number 3 spindle and operated at 100 revolutions per minute. The reading is taken within 20 seconds or when the curve breaks.

Gallenkamp Build-up Test

This test is conducted on a Gallenkamp Universal Torsion Viscometer model VHA-200-M (manufactured by Gallenkamp, London, Englang). Cylinder VHA-220-050G (11/16" diameter) and tosion wire VHA-220-2110K (30 swg) are used in the test. In this test, a sample of slurry is mixed with the Lightning Mixer for about 1 minute. The Gallenkamp is pre-loaded (turned one revolution). About 250 cubic centimeters of the mixed slurry is transferred to a beaker which is placed under the Gallenkamp with the spindle of the Gallenkamp submerged in the slurry. The spindle is then released, and a reading is taken of how many degrees overswing it rotates in the slurry. Thereafter the spindle is again loaded, the shaft is wetted with water, 6 minutes is allowed to elapse, the spindle is again released, and a second reading is taken of how many degrees overswing it rotates. The difference between the first reading and the second reading, in degrees, is the Gallenkamp build up.

Gel Test of the Ball Clay Slurry

In order to stabilize the lateral migration of colloids due to casting and the vertical settling of particles due to gravity, the slurry must possess a gel structure. This gel structure results from the synergistic interaction between the colloids, deflocculants, and the flocculants. Its rate and extent of build up are both determined by the gel test. Some gels in slurries build up slowly at first and then proceed at an accelerating rate. The vertical stability of the large particles is acceptable in such a slurry, but the lateral stability is very poor at the beginning of the casting, thereby reducing the casting rate.

By way of illustration of the importance of the gellation rate, consider a comparison of the slurry of this invention and a prior art slurry and assume that both have the same viscosities at time 0 and 20 minutes. The prior art slurry curve might be sharply concave upward to that its gellation rate at 20 minutes is accelerating toward a very high viscosity, severl times higher than its 20 minute viscosity; this slurry will not drain or flow after 30 to 60 minutes casting. By comparison, the gellation of the slurry of this invention is approaching a terminal viscosity which may only be 5-10% greater at 60 minutes than it is at 20 minutes. The viscosity differences between 20-5 minutes and 20-10 minutes provide data to guarantee that the gellation is approaching a low terminal value which will allow excellent drain properties after 60 or more minutes of casting.

In the gel test, the tendency of the ball clay slurry to increase in viscosity due to the development of a gel structure within the slurry at certain specified points in time is measured. The equipment used for this test is a Brookfield Viscometer, model RVTD (manufactured by the Brookfield Engineering Laboratories of Stoughton, Mass.) equipped with a number 1 spindle and operated at 0.5 revolutions per minute. The viscometer is eqped with a stirp chart recorder, and the output of the viscometer is fed to the recorder. The Y axis of the recorder measures torque, and, in accordance with a chart supplied by the Brookfield Engineering Laboratories, torque is converted to viscosity. The X axis of the strip chart recorder measures time. Thus, from the strip chart, one can read viscosity as a measure of time.

A freshly stirred, 500 cubic centimeter sample of ball clay slurry is used in this test. The term "freshly stirred" means that any given sample has been agitated sufficiently to break down any agglomeration caused by gellation due to quiescent storage. The term "freshly made," as used in this specification, refers to a time measured from the blending of a new batch of slurry and up to five hours thereafter.

The spindle is inserted into the 500 cc. slurry sample, and measurement is started at time 0 while the spindle is turning. The term "time 0," as used in this case, refers to the start of teh gel test when the Brookfield viscometer begins measuring the viscosity oat 0.5 r.p.m. of a "freshly stireed" sample.

The 0.5 r.p.m. spindle speed is used because it is too low to prevent gellation; higher spindle speeds can break gel structure down faster than it can build up.

The gel viscosity, in centipoise, is measured at 5 minutes, 10 minutes, and 20 minutes. Thereafter, the difference between the 20 minute reading and the 10 minute reading is calculated. In addition, the difference between the 20 minute reading and the 5 minute reading is calculated.

In order to determine to what extent, if any, the slurry properties change with age, the same test is repeated with the exception that the slurry sample is allowed to sit three days after it has been tested when "freshly made." After three days of so sitting, the slurry is "freshly stirred," and its 5-minute, 10-minute, and 20-minute gel viscosities are determined. The gel viscosity properties obtained with the three day old sample are compared with the properties obtained with the freshly made sample.

Flow Index of the Ball Clay Slurry

The flow index of the ball clay slurry is determined in accordance with a flow tube test which utilizes conventional polyvinylchloride pipe which has an inside diameter of 2.0 inches and which is 6.0 inches long. One end of the tube is equippedwith a rounded cap in the center of which is a 5/32" hole. In the test, the hole in the cap is sealed with a tapered plug and the tube is filled to the top with 400 milliliters of ball clay slurry. The tube is placed on top of a graduated clyinder and not disturbed for 6 minutes. After six minutes, the plug is carefully pulled, and the time it takes the slurry to fill the graduated cylinder from the 50 milliliter mark to the 250 milliliter mark is carefully measured. This time, in seconds, is the flow index of the ball clay slurry.

Settling Index of the Ball Clay Slurry

This test is used to determine the stability of the slurry to resist the settling of particles out of suspension due to gravity. The gel structure developed in the slurry must be sufficient to prevent such settling. A high value of settling index means that very little setting has occurred.

The settling index of the ball clay slurry is measured by a test in which a half-gallon sample of the slurry is first mixed for 2 minutes on a Lightning V-7 Mixer ("Lightning Mixer") which is manufactured by the Mixing Equipment Company of Rochester, N.Y.

Thereafter, a sample of the mixed slurry is weighed out and put into a small aluminum container. The container is then placed in an oven set at 80 degrees Centigrade and allowed to dry for about 16 hours. The weight of the dried sample is then determined, and the initial solids content of the slurry is then calculated.

Thereafter, a half-gallon sample of the slurry is mixed for two minutes on the Lightning Mixer. A cylindrical polyvinyl chloride tube which is 11.0 inches long and has an inside diameter of 54.4 millimeters is used. The bottom portion of the tube is covered with a small cap, and 600 ml. of slurry is poured into the tube. The tube is then sealed at the top with "Saran Wrap" to prevent evaporation. The filled tube is then placed upright in a 4.0" deep water in a "Blue M Magni Whirl Constant Temperature Bath" (manufactured by the Blue M Electric Company of Blue Island, Ill); the apparatus is set at a temperature of 35 degrees centigrade with a four second pulse duration and frequency. The tube of slurry is then allowed to settle undisturbed in the bath for 10 days. After ten days in the bath, the tube of slurry is removed from the bath and placed upright in a conventional freezer for about 16 hours. Thereafter, it is removed from the freezer and rotated under a stream of hot water to slightly melt the outer surface of the slurry so that the cap can be removed and the slurry pushed out of the tube. The clyinder of slurry removed from the tube is sampled—a one inch sample is cutt off from each of the top and the bottom of the sample using a common backsaw. Each of the one-inch samples is then placed in separate 400 milliliter beakers of known weights. Each of the filled beakers is weighed, placed in an oven set at 80 degrees centigrade, and allowed to dry for 16 hours. The weight of each of the one-inch samples is then calculated from this data. The settling index is equal to the solids content of the top one-inch sample (in percent) divided by the solids content of the bottom one-inch sample (in percent).

A settling index of 1.0 indicates the same solids content on top and bottom, i.e., no settling has occurred.

Casting Rate of the Ball Clay Slurry

The casting rate of the ball clay slurry is determined by a test in which a 300 cubic centimeter sample of the slurry, at a solids content of 60 dry weight percent of slurry, is filter pressed through a Whatman 2.5 micron No. 5 filter paper with 98 percent retention above 2.5 microns in an NL Baroid Series 300 Standard API Filter Press (manufactured by NL Industries of Houston, Tex.) at 30 pounds per square inch for 60 minutes, the filter press is then drained for five minutes, and the filter cake is weighed. The casting ratio is equal to the number of grams (wet weight) in the filter cake after 60 minutes.

Soluble Sulfate Content of the Ball Clay

The soluble sulfate content of the ball clay is determined in accordance with A.S.T.M. test C86-77 with a Bausch & Lomb Spectronic 20, Catalog No. 33.31.72 (manufactured by the Bausch & Lomb Company, Rochester, N.Y.).

Transmission of the Ball Clay Slurry Filtrate

The transmission of the filtrate of the slurry is determined by taking a 300 cc. sample of the slurry, filter-pressing it through a Whatman No. 5 filter paper with 98 percent retention above 2.5 microns in an NL Baroid Series 300 Standard API Filter Press at 30 psi. for 60 minutes, taking a 15 cubic centimeter sample of the filtrate, and testing the transmission of the filtrate sample in a Bausch & Lomb Spectronic 20 using a 400 nanometer wavelength. High opacity means low transmission; it indicates a substantial amount of organic matter in the filtrate rather than adsorbed on the clay.

Dry Modulus of Rupture of the Ball Clay

The dry modulus of rupture of the ball clay is determined in accordance with a test in which a cast bar is prepared from 50% clay and 50% flint; the clay is dispersed in water at 55.5% solids. After adding the flint, the slurry is deflocculated to minimum viscosity with a sufficient amount of Colloid 211 (a liquid sodium polyacrylate dispersing agent with a solids content of 43 percent which is sold by the North Chemical Company of Marietta, Ga.) and cast into ¾" diameter×7" long clay bars. Thereafter, the dry modulus of rupture of these bars is determined.

The ball clay/water slurry of this invention may be cast into bars which have a dry modulus of rupture of from about 550 to about 700 pounds per square inch. The dry modulus of rupture of the ball clay/water mixture is tested by a procedure in which the solids content of the slurry is first adjusted to 55.5 percent, by weight. Then, a sufficient amount of "Colloid 211" is added to the mixture until its Brookfield viscosity at ambient conditions and 100 r.p.m. is 200 centipoise or less.

A 1,000 gram sample of this mixture then has 555 grams of flint added to it, thereby raising its solids content to 71.4 percent. To this mixture, the Colloid 211 is again added until the Brookfield viscosity of the mixture is 200 centipoise or less. Then the mixture is slip cast into bars ¾" I.D.×7" long. The cast mixture is allowed to stand for about 6 hours. Bars are then removed. The cast bars are then air dried for 8 hours, and they are then dried at 100 degrees Celsius for an additional 16 hours. These dried bars are then placed in a dessicator and cooled to room temperature. The bars are then removed one at a time to be broken and tested, while the other bars are allowed to remain in the dessicator to prevent absorption of hygroscopic moisture. The bars are broken on a Dillon Dynomometer, Serial No. 2033-2 (WO. C. Dillon & Co., Inc., 14620 Keswick Stree, Van Nuys, Ca.).

The span to diameter ratio for this test should be at least 2.7:1. Thus, for example, for an 0.75" diameter rod the span shoudl be 2.0". At least 8 rods should be broken for each cast body to provide reasonable statistical data for determining the mean modulus of rupture. Alternatively, bars of rectangular cross-section may be used.

The formula for determining the modulus of rupture with round crosssection bars is:

$$MOR = \frac{8PL}{\pi D^3}$$

wherein MOR is the modulus of rupture, P is the force at fracture, L is the span between knife edges, and D is the diameter of the rod.

The formula for determining the modulus of rupture when rectangular bars are used is:

$$MOR = \frac{3PL}{2bd^2}$$

wherein b is the width of the bar, and d is the thickness of the bar.

The modulus of rupture of a virgin ball clay/water control mixture which contains precisely the same ball clay(s) as the test slurry is then determined. As used in this specification, the term "virgin ball clay/water mixture" refers to a ball clay/water mixture which has neither been digested (by having digested agent mixed with clay and water) nor has had one or more digested organic materials added to it. Flint is added as before, the solids content of the "virgin ball clay/water mixture" is adjusted to 71.4 percent, and its modulus on rupture is tested in accordance with the aforementioned procedure.

If the mean modulus of rupture of the test slurry is at least 5 percent greater than the mean modulus of rupture of the control slurry then the test slurry is deemed to be "digested."

DESCRIPTION OF THE PREFERRED EMBODIMENTS

The clay/water slurry of this invention will first be described by reference to a preferred process by which it may be made. Thereafter, the properties of the clay/water slurry will be discussed in detail.

Flow Chart Illustrating Preparation of the Ball Clay Slurry

In the process illustrated in FIG. 1, a preferred process for preparing the ball clay slurry of this invention is illustrated.

Ball clays, as mined, are very heterogeneous in those properties crucial to the production of a consistent ball clay slurry, from top to bottom and laterally throughout the mineral deposit. For this reason, a single clay sample cannot produce ball clay slurry with consistent properties. Several deposits, or several locations within a single deposit, may be required to make ball clay slurries. For the purposes of this specification, each ball clay sample which displays unique properties is considered to be a separate ball clay, even if it came from the same deposit.

Prior to the time the ball clay is mixed with water and chemicals, the properties of a candidate ball clay are evaluated. Thus, for example, a ball clay to be used from deposits 10, 12, 14, 16, and/or 18 is sent first to lab 22 and specific properties are measured. The measurements include (1) chemical analysis, (2) rational analysis useing the Mica Convention, (3) particle size distribution, determined by the techniques described above, (4) pH of the clay, measured by a conventional pH meter, (5) deflocculation potential, measured by the aforementioned deflocculation test, to determine how much deflocculant will bring it to minimum viscosity, (6) dry modulus of rupture of the clay, (7) fired color of the clay, which is determined by visual means, (8) percent drying shrinkage of the clay and the percent firing shrinkage of the clay, measured by means well known to those skilled in the art, and (9) other properties of the clay, such as soluble sulfate content and the amount of digesting agent to be added.

In a preferred embodiment, a 600 gram sample of the ball clay from one or more of deposits 10, 12, 14, 16, or 18 is tested in lab 22 to determine how much digesting agent should be added to the slurry. This test (the transmission test) is described elsewhere in this specification.

One may use sodium hydroxide instead of soda ash to digest the clay.

The soluble sulfate content of the ball clay to be used in the process can be determined from A.S.T.M. test C-867-77. If the soluble sulfate content exceeds the amount required in the slurry, the sulfate content can easily be reduced by adding, for example, barium carbonate in soichiometric proportions. Thus, for example, 2.05 pounds of barium carbonate must be added for each pound of sulfate ion one wishes to retire from the slurry.

This preliminary evaluation determines which storage shed the clay should be sent to.

Analysis of the ball clay prior to the time it is slurried allows one to determine, for any give desired slurry, with a given set of properties, whether a given ball clay should be blended with one or more other ball clays to achieve a different mix of properties. The final ball clay/water slurry can contain more than one ball clay. Accurate sampling of large, dry, bulk quantities is very difficult, so this only gives starting approximations of the final product.

After being analyzed in laboratory 22, clay from one or more of deposits 10, 112, 14, 16, and/or 18, is charged via line 24 to one or more of storage sheds 26, 28, 30, 32, and 34, according to the specifications of earlier material already stored in the shed(s).

In the description from this point on, the preparation process described refers to a method of making one ball clay/water slurry ingredient which when blended with other such ball clay/water ingredients, will produce the final product. It is to be understood that a similar process is to be used for preparing each of the other ball clay/water ingredients.

Clay from one or more of storage sheds 26, 28, 30, 32, and/or 34 is fed via line 36 to weigh hopper 38 and thence, via line 40 to roller-crusher 42. Feeding means well known to those skilled in the art can be used to convey the clay from the storage shed. Thus, e.g., one can use any of the conveying and/or feeding means described on page 7-4 of R. H. Perry and C. H. Chilton's "Chemical Engineer's Handbook," Fifth Edition, McGraw-Hill Book Company (New York, 1973) to convey the clay from the storage shed to weigh hopper 38 and roller-crusher 42.

The crusher 42 reduces the particle size of the clay so that substantially all of the particles in the clay are 1.5 inches or finer.

As used in this specification, the term "hopper" refers to a vessel in which materials are fed, which usually is constructed in the form of an inverted pyramid or cone terminating in an opening through which teh materials are discharged. Any of the hoppers known to those skilled in the art can be used in the process of this invention.

The clay to be used in the process is weighed, and a suitable amount of clay is fed so that 55,000 pounds of clay (dry basis) are in weigh hopper 38.

The clay from crusher 42 is fed via line 44 to blunger 46. As is used in this specification, the term "blunger" refers to a cylindrical vessel containing a rotating shaft with fixed knives useful for blunging. Blunging is the process of blending or suspending ceramic material in liquid by deagglomeration and agitation.

In the process of this invention, hot water, digesting agent, organic polyelectrolyte, sulfate adjusting agent, pH adjusting agent, and other desired chemical additives are added to blunger 46 via line 45. It is preferred that those reagents be fed into the blunger in a certain sequence. The organic polyelectrolyte used in the process is preferably not fed into the blunger until at least about 50 percent of the clay has been fed into the blunger and all of the digesting agent to be used has been added. Furthermore, if the soluble sulfate content of the ball clay is too high, it is essential that the organic polyelectrolyte not be fed into blunger 46 until the soluble sulfate ion concentration has been reduced to the required level.

A sufficient amount of water is fed into blunger 46 via line 45 so that, when the water has been mixed with all of the clay from hopper 38, a clay/water slurry with the required solids content will be produced. It is preferred that the water be hot, that it be at a temperature of from about 140 to about 200 degrees Fahrenheit. It is even more preferred that the water be at a tempeature of from about 150 to about 190 degrees Fahrenheit. In an even more preferred embodiment, the water is at a temperature of from about 160 to about 180 degrees Fahrenheit. In the most preferred embodiment, the water is at a temperature of from about 165 to about 175 degrees Fahrenheit.

The required amount of digesting agent, as determined by the test described elsewhere in this specification, is added to blunger 46 via line 45. Alternatively, or additionally, some or all of the digesting agent can be added with the water through line 45. In either event, it is preferred that the digesting agent and any sulfate adjusting agent used be added to blunger 46 in the form of aqueous solutions. In general, from about 0.0 to 0.1 percent, by weight of dry clay, of digesting agent is used in the process of the invention.

It is preferred that all of the digesting agent required in the process be mixed with water in blunger 46 before any of the ball clay is charged to the blunger. Furthermore, it is preferred that at least half the ball clay to be used in the process be mixed with water and the digesting agent prior to the time the organic polyelectrolyte is added to the blunger.

If the ball clay used in the process contains more than about 650 parts per million of soluble sulfate ion, then the clay should be mixed with a sulfate reducing agent prior to the time the polyelectrolyte is added. The sulfate reducing agents which can be used include barium carbonate, barium monohydrate, barium octahydrate, mixtures thereof, and the like. The amount of sulfate reducing agent can be determined by stoichiometric calculation.

The ball clay from crusher 42 is fed into blunger 46 over a period of from 25 to about 120 minutes. It is preferred to feed the clay into the blunger over a period of from about 35 to about 90 minutes. In a more preferred embodiment, the clay is fed into the blunger over a period of from about 40 to about 60 minutes.

In one embodiment, organic polyelectrolyte is fed into blunger 46 only after two things have occurred; (1) at least about 50 percent of the ball clay from hopper 38 has been fed into blunger 46, and (2) the mixture in blunger 46 becomes too viscous to effectively agitate.

During blunging, clay/water mixture from the bottom of blunger 46 is fed via line 52 to Gorator 54, to the in-line viscometer 56, and then returned into blunger 46. As is known to those skilled in the art, the Gorator is a grinding apparatus manufactured by Dorr-Oliver Company of Stamford, Conn. Its function is to reduce the size of any lump in the slurry. The in-line viscometer is a single-speed viscometer manufactured by Brookfield Engineering Company of Staughton, Mass. Its function is to continuously monitor the viscosity of the slurry in the blunger 46.

When the viscosity of the mixture in blunger 46 exceeds about 8,000 centipoise, then organic polyelectrolyte is added to the blunger, condition (2) having occurred; this addition reduces the viscosity, and blunging and/or clay addition is continued until the viscosity again exceeds about 8,000 centipoise. The process is continued until all 55,000 pounds of the ball clay are blunged and the final viscosity of the mixture is about 200 centipoise or less at about 60 percent solids content.

If the Gallenkamp build-up is too high, and/or the Brookfield viscosity at 100 r.p.m. is too high, more organic polyelectrolyte is added to the blunger. When the slurry in blunger 46 has the desired viscosity, solids content, and Gallenkamp build-up, as measured in laboratory 50, the slurry is discharged via line 58 to scalper screen 60.

Scalper screen 60 is a 30 mesh screen which removes oversize particles. Other suitable screesn can be used to remove particles greater than about 600 microns. Thus, e.g., one can use any of the screening devices shown on pages 21-39 to 21-44 of the Perry and Chilton "Chemical Engineers' Handbook."

Oversize particles from scalper screen 60 may contain substantial portions of clay minerals and may be recycled via line 62 to blunger 46 for reagitation.

Slurry passing through scalper screen 60 is passed via line 64 to finishing screen 66. Finishing screen 66 is an 80 mesh screen which removes all particles gerater than 180 microns. The oversize from screen 66 usually contains coarse particles of undesirable sand and lignite, which material is transferred via line 68 to dump 70 for disposal.

Although only one scalper screen 60 and only one finishing screen 66 are shown in FIG. 1, a multiplicity of such screens can be used. Thus, in one embodiment, two scalper screens 60 and five finished screens 66 are used.

The slurry which passes through finishing screen 66 is fed via line 72 into surge tank 74. Samples of slurry are taken via line 76 to lab 78 for evaluation of specific properties. This slurry can later be blended with other ball clay/water slurries to obtain desired final blend properties. The specific properties evaluated in lab 78 at this point are:

a. Specific Gravity—The specific gravity of the slurry should be from about 1.57 to about 1.61. In one embodiment, the specific gravity is about 1.585.

b. Gallenkamp Build-up—It is preferred that the build-up be from about 30 to about 60 degrees and, more preferably, from about 40 to about 60 degrees.

c. Casting Rate—The casting rate should be from about 30 to about 60 grams in one hour and, preferably, froma bout 34 to about 45 grams in one hour.

d. pH, Soluble Sulfate Ion Concentration, and Percent Transmission—These properties are also measured at this time, for future adjustment, although they are not critical at this time.

The slurry from surge tank 74 is passed via line 80 through electromagnetic filter 82 to remove magnetic particles from the slurry. The slurry is then passed via line 84 to one of agitated storage tanks 86, 88, and 90.

As illustrated in the Examples of this case, slurries can be made from different clays with different properties using the process of FIG. 1, and some or all of the slurries can then be blended to produce a slurry with final properties. For example, a single clay from storage shed 18 may finally be placed in the slurry tank 90. Tanks 86 and 88 may contain slurries with different properties, from different sheds, all determined in lab 78. Based on these properties, the specific proportions from 86, 88, and 90 may be blended via line 96 and volumetric pump (not shown) into final storage tank 98. The specific additional properties measured in lab 94 are:

a. Particle Size Distribution—The CPFT at 5 microns, 2 microns, and 0.5 microns are determined from the Sedimentometry Analysis described elsewhere.

b. Specific Surface Area—The S.S.A. of the solid fraction of the slurry is measured as described elsewhere.

Using these data, and the data from lab 78, in a linear optimization program the final properties of the blended slurry are predicted. The final slurry is then blended from tanks 86, 88, and 90 and passed via line 96 into final slurry tank 98. Final evaluation of all pertinent properties is then repeated in lab 102. In addition, the Particle Stability, Rheological Stability, and Polymer Stability properties of the slurry are measured.

Properties of the Ball Clay/Water Slurry

The ball clay/water slurry of this invention is blended, that is, it is prepared from at least two other ball clay/water slurries. In one embodiment, the slurry is prepared by blending at least three ball clay/water slurries; this embodiment is illustrated in the Examples.

In order to be able to consistently obtain a ball clay slurry with the unique and rather specific combination of properties possesses by applicant's slurry, the wet blending of at least two ball clay slurries is required.

The ball clay slurry of this invention comprises from about 58 to about 68 percent (by total weight of slurry) of ball clay (dry basis) and from about 42 to about 32 percent (by total weight of slurry) of water. It is preferred that the slurry contain from about 58 to about 65 percent (by weight of slurry) of ball clay and from about 4 to about 35 weight percent of water. In a more preferred embodiment, the slurry contains from about 59 to about 61 percent by weight, of ball clay, and from about 42 to about 39 percent, by weight, of water.

Unless otherwise specified in this case, the weight of ball clay in the slurry is on a substantially moisture-free ("dry") basis. Clay material is consideredto be "dry" when it has substantially zero percent moisture. A 500 gram sample of ballclay which is dried at 105 degrees Centigrade for 12 hours is considered to be "dry" for the purposes of this specification. As is well known to those skilled in the art, larger samples of ball clay will require longer drying times and/or higher temperatures.

If the solids content of the ball clay/water slurry is outside of the desired range, the viscosity stability and-/or the particle stability and/or the flow rate of the slurry will often be unacceptable.

The ball clay slurry of this invention has an initial Brookfield 100 rpm. (revolutions per minute) viscosity of from about 100 to about 600 centipoise. It is preferred that the initial viscosity of the slurry be from about 140 to about 500 centipoise. In one embodiment, the initial viscosity is froma bout 150 to about 270 centipoise. In another embodiment, the initial viscosity is from about 170 to about 210 centipoise.

The ball clay in applicant's slurry has a particle size distribution such that from about 30 to about 45 percent of the ball clay particles are smaller than 0.5 mirons, from about 53 to about 69 percent of the ball clay particles are smaller than 2 microns, and from about 70 to about 85 percent of the ball clay particles are smaller than 5 microns; and the ball clay has a specific surface area of from about 16 to about 21 square meters per gram. In a preferred embodiment, the particle size distribution of the ball clay is such that from about 34 to about 40 percent of the ball clay particles are smaller than 0.5 microns, from about 57 to about 65 percent of the ball clay particles are smaller than 2 microns, and from about 74 to about 82 percent of the ball clay particles are smaller than 5 microns; and the ball clay has a specific surface area of from about 16.5 to about 20 square meters per gram. In a more preferred embodiment, the particle size distribution is such that from about 36 to about 38 percent of the ball clay particles are smaller than 0.5 microns, from about 59 to about 63 precent of the ball clay particles are smaller than 2 microns, and from about 76 to about 80 percent of the ball clay particles are smaller than 5 microns; and the specific surface area of the ball clay is from about 17 to about 19 square meters per gram. In the most preferred embodiment, the specific surface area of the ball clay is from about 17 to about 18.5 square meters per gram.

One of the most important set of properties possessed by applicant's ball clay is its gell viscosity properties. These properties define applicant's slurry in at least six different respects.

The gel test of the ball clay slurry is described in the "definition of tests and tems used in this specification" section of the case. The clay slurry sample is freshly stirred, and measurements of the slurry viscosity are taken at 0 minutes, 5 minutes, 10 minutes and 20 minutes.

It should be noted that, in this test, the viscosity of the entire slurry is measured. The gel is a slurry component which causes certain viscosity increases. However, despite the name of the test, the viscosity of the slurry and not only that of the gel is measured.

When the ball clay slurry is "freshly made," it is tested by being "freshly stirred" and then by having its 0 minute, 5 minute, 10 minute, and 20 minute viscosities measured on a Brookfield viscometer, using a 0.5 r.p.m. shear rate.

Three days after the ball clay slurry has been "freshly made," it is tested by being "freshly stirred" and having the same time measurements repeated.

For the freshly-made slurry, the five minute viscosity is from about 1,000 to about 10,000 centipoise, then ten minute viscosity is from about 2,200 to about 12,000 centipoise, and the twenty minute viscosity is from about 3,500 to about 14,000 centipoise.

For both the freshly-made and the three-day old slurry, the different between the twenty-minute viscosity and the ten minute viscosity is less than 3,00 centipoise. In one embodiment, for both the freshly-made and the three-day old slurry, the difference between the twenty-minute viscosity and the ten minute viscoisty is from about 1,300 to about 3,000 centipoise.

For both the freshly-made and the three-day old slurry, the difference between the twenty-minute viscosity and the five minute viscosity is less than 4,000 centipoise. In one embodiment, for both the freshly-made and the three-day old slurry, the difference between the twenty-minute viscosity and the five-minute viscosity is from about 2,500 to about 4,000 centipoise.

For the three-day sample of slurry, the twenty-minute viscosity is froma bout 3,500 to about 14,000 centipoise and, furthermore, is no more than about 50 percent greater than the twenty-minute viscosity of the freshly-made slurry sample.

In one embodiment, the ten minute viscosity of the three-day sample is no more than 50 percent greater than the ten minute viscosity of the freshly-made sample and, furthermore, is froma bout 2,200 to about 12,000 centipoise.

In one embodiment, the five-minute viscosity of the three-day sample is no more than 50 percent greater than the five minute viscosity of the freshly-made sample and, preferably, is froma bout 1,000 to about 10,000 centipoise.

The ball clay slurry of this invention is comprised of from about 0.01 to about 1.0 percent of organic polyelectrolyte, calculated on the weight of the active ingredient in the polyelectrolyte by the weight of the dry ball clay in the slurry. It is preferred that the slurry comprise from about 0.01 to about 0.5 percent of organic polyelectrolyte and, more preferably, from about 0.1 to about 0.4 percent of said polyelectrolyte. In the most preferred embodiment, the slurry is comprised of from about 0.15 to about 0.3 percent of organic polyelectrolyte.

The organic polyelectrolyte used in the slurry of this invention has a molecular weight of from about 1,400 to about 6,000 and, preferably, from about 2,300 to about 4,300. In a more preferred embodiment, the molecular weight is from about 3,000 to about 3,800. In the most preferred embodiment, the molecular weight is from about 3,300 to about 3,500.

The molecular weight of the organic polyelectrolyte may be determined by means well known to those skilled in the art. Thus, by way of illustration and not limitation, the molecular weight may be determiend by gel permeation chromatography instrumentation operated in a size exclusion separation function. Suitable apparatus includes, .e.g., a Perkin Elmer HPLC system.

It is preferred that the organic polyelectrolyte used in the slurry of this invention have at least one site on each recurring structural unit which, when the polyelectrolyte is in aqueous solution, provides an electrical charge. In one embodiment, the organic polyelectrolyte has at least two such sites per recurring unit.

It isp referred that the organic polyelectrolyte be a polymeric polycarboxylate which contains the following repeating carboxylate group:

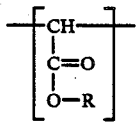

wherein R is hydrogen, a monovalent cation, or an organic radical. Illustrative of such compounds are polymers and copolymers of acrylic acid, represented by the repeating group:

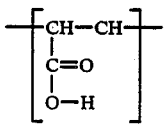

along with salt and ester derivatives thereof. Illustrative polymers described by these formulae include acrylic acid-maleic anhydride copolymer, acrylic acid itaconic acid copolymer, acrylic acid-succinic anhydride coplymer, acrylamide-acrylic acid copolymer, polyacrylamide, vinyl acetate-maleic anhydride copolymer, styrene-maleic anhydride copolymer, ammonium polyacrylate, sodium polyacrylate, ammonium polymethacrylate, sodium polymethacrylate, diethanolammonium polyacrylate, guanidinium polyacrylate, dimethyl-aminoethyl polymethacrylate, acrylamide-acrlyonitrile copolymer, methacrylic acid--dimethyl-aminoethyl methacrylate copolymer, sodium polyacrylate-vinyl alcohol copolymer, hydrolyzed methacrylic acid-acrylonitrile copolymer, vinyl formate-maleic anhydride copolymer, vinyl methyl ether-maleic anhydride copolymer, isobutylenemaleic anhydride copolymer, styrene-maleic anhydride copolymer, ethyl acrylate-maleic anhydride copolymer, vinyl chloride-maleic anhydride copolymer, acrylonitrile-methacrylonitrile copolymer, acrylonitrilemethacrylonitrile-vinyl acetate terpolymer, acrylonitle-methacrylic acid copolymer, vinyl pryidine-acrylonitrile copolymer, and the like.

In one embodiment, one or more polyacrylate resins are used as the organic polyelectrolyte. Suitable polyacrlyate resin include, e.g., the alkali metal and ammonium salts of polycarboxylic acids such as, for example, polyacrylic acid, polymethacrylic acid, and the like.

In one embodiment, the clay/water slurry of this invention is comprised of the salt of a polymeric polyacrylate. Preferred examples of such compounds are polymers of acrylic acid represented by the repating group:

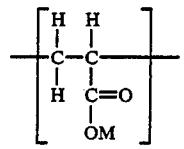

wherein M is selected from the group consisting of hydrogen, sodium, potassium, and ammonium. It is preferred that M be selected from the group consisting of sodium and ammonium. Suitable polycarboxylates include Darvan 811 (a polyacrylate sold by the R.T. Vanderbilt Company), Alcosperse 144 (a sodium polyacrylate sold by the Alco Chemical Corporation of Chattanooga, Tenn.), Colloid 102 (an ammonium polyacrylate sold by the North Chemical Company of Marietta, Ga.), Colloid 211 (a liquid sodium polyacrylate with a solids content of 43 percent sold by the North Chemical Company of Marietta, Ga.), Alcospherse 249 (an ammnoum polyacrylate sold by the Alco Chemical Corporation), Dispex N-40 (sold by the Allied Colloid Corpration of England), and the like. These dispersing agents, and other polyacrylate dispersing agents, are discussed in McCutcheon's "Emulsifiers and Detergents" (M.C. Publishing Company, Glen Rock, N.J., 1985), the disclosure of which is hereby incorporated by reference into this specification.

Mixtures of organic polyacrylates can be used in the ball clay/water slurry of this invention.

It is preferred that the organic polyelectrolyte, when tested in accordance with a specified test, produce a clay/water mixture with a viscosity less than 150 centipoise. In this test, a Bandy Black clay is used which has about 25 percent of its particles finer than 0.5 microns, contains 1.9 percent (by weight of dry clay) of organic matter, and contains 595 parts per millino (by dry weight of clay) of soluble sulfate ion. A mixture containing 50 parts of this Bandy Black clay and 50 parts of water is prepared. To this mixture is added 0.5 percent (by weight of dry clay) of the candidate dispersant. The mixture is then stirred for two minutes, and its viscosity is then tested on a Brookfield viscometer equipped with a number 3 spindle and operated at 100 revolutions per minute. The candidate polyelectrolyt epasses this test if the viscosity of the test mixture is 150 centipoise or less.

In one embodiment, in addition to containing the organic polyelectrolyte, the ball clay slurry also contains from about 0.1 to about 7.0 percent, by weight of dry ball clay, or at least one humic substance selected from the group consisting of humic acid, humate, and mixtures thereof. It is preferred that the slurry contain from about 0.3 to about 3.0 percent of said humic substance. In an more preferred embodiment, the slurry contains from about 0.5 to about 2.5 percent of said humic substance.

In one preferred embodiment, the preferred humic substance is a metal humate selected from the group consisting of sodium humate, potassium humate, ammonium humate, calcium humate, and mixtures thereof.

In one embodiment, the humic substance(s) is provided to the ball clay slurry by the digestion of digestible organic matter. In another embodiment, the humic substance(s) is provided to the slurry by the addition of said substance to the slurry.

If the humic substance(s) is to be provided to the ball clay slurry by digestion, one can use the digestible organic matter test to determine how much digesting agent should be added to the slurry. This test is different from the determination of the organic content in the ball clay. The test determines if the organic matter is digestible and, thus, is useful to the slurry properties. In this test, 600 grams of the ball clay are mixed with 400 grams of hot water, which is at a temperature of at least 150 degrees Fahrenheit. To this mixture is then added a 20 weight percent solution of soda ash; this solution is added in ten-drop increments. After each tendrop increment of the soda ash has been added to the mixture, the mixture is stirred for two minutes with a Lightning Model V-7 Mixer ("Lightning Mixer") which is manufactured by the Mixing Equipment Company of Rochester, N.Y.; the viscosity of the stirred mixture is then determined on a Brookfield viscometer equipped with a number 3 spindle operated at 100 revolutions per minute; and the transmission of the stirred slurry is determined in accordance with the transmission test described elsewhere in this specification.

If the viscosity decreases from a first to a later incremental sample, of if the transmission decreases, then the ball clay being tested contains digestible organic matter. In general, it is desired that the transmission of the slurry filtrate not be below about 70 percent, although a slurry whose transmission is at least about 60 percent sometimes is suitable for certain purposes. Thus, when the addition of the digesting agent (such as soda ash) finally results in a slurry whose transmission is below the required level, one knows that maximum amount of the particular digesting agent which can be used in the process: the total amount of digesting agent which will give minimum viscosity without reducing the transmission below the required level should be used to digest the ball clay.

If the ball clay to be used in the process does not contain from about 0.1 to about 7.0 percent, by weight of dry clay, of digestible organic matter, one or more commercially available digested organic materials can be mixed with the clay, water, and polyelectrolyte. Thus, by way of illustration, one can add from about 0.1 to about 7.0 percent of "Supertreat" and/or "Carbonox" and/or other similar substances. These humic substances have variable high molecular weights. Without wishing to be bound to any particular theory, applicant believes that they serve as auxiliary dispersant when converted to the alkali form. It is possible that small quantities of other high molecular weight dispersants may be substituted as similar substance.

Those skilled in the art are well aware of the various humic substances which are commercially available. Thnus, e.g., "Supertrest" is sold by the American CDolloid Company of Skokie, Ill. Thus, e.g., "Carbonox" is sold by N.L. Industires of Highstown, N.J.

The slurry of this invention is comprised of from about 50 to about 650 parts per million (by weight of dry ball clay) of flocculating ions. Some of the flocculating anions which may be used include, e.g., sulfate ion, carbonate ion, phosphate ion, chloride ion, and mixtures thereof.

These flocculating anions are also necessarily accompanied by the cations of the various soluble salts which commonly are found in clay deposits. The most common dissolved salt found is gypsum or calicum sulfate. These flocculants both hinder and enhance slurry poroperties. In excess, they prevent proper deflocculation to the targeted low viscosity. In correct concentrations, they react the thje polymeric polyelectrolytes to provide the correct gellation; it is believed that this correct gellation is strongly but not exclusively responsible for the flow index and settling index and casting rate properties of the slurry. Measurement of the flocculant cations is extremely difficult. Measurement of the accompanying molar equivalent of anion, such as sulfate, is very simple.

In one preferred embodiment, the flocculating ion is soluble sulfate ion. In this embodiment, it is preferred that the ball clay slurry comprise from about 250 to about 550 parts per million (by weight of dry ball clay) of soluble sulfate ion. In an even more preferred embodiment, the ball clay slurry comprises from about 350 to about 450 parts per million of soluble sulfate ion.

If the level of soluble sulfate ion in the slurry is too high, one may belnd the slurry with another slurry so that the blended slurry has the required concentration of soluble sulfate ion. Alternatively, or additionally, one can add soluble sulfate ion reducing agent(s) to the slurry. Thus, e.g., one can add such agents as barium carbonate, hydroxides of barium, mixtures thereof, and the like.

If the level of soluble sulfate ion in the slurry is too low, one may blend the slurry with another slurry so that the blended slurry has the required concentration of soluble sulfate ion. Alternatively, or additionally, one can add soluble sulfate ion increasing agents such as, e.g., calcium sulfate, magnesium sulfate, sodium sulfate, aluminum sulfate, mixtures thereof, and the like.

The ball clay/water slurry of this invention has a settling index of at least about 0.9. It is preferred that the settling index of the slurry be at least about 0.95. It is even more preferred that the settling index be about 0.98. In the most preferred embodiment, the settling index of the slurry is 1.0.

The ball clay/water slurry of this invention has a flow index of from about 20 to about 30 and, preferably, from about 21 to about 25. In one embodiment, the flow index of the slurry is about 23.

The ball clay/water slurry of this invention contains from about 50 to about 65 percent of silica (by weight of dry ball clay in the slurry0 and from about 20 to about 35 percent (by weight of dry ball clay) of alumina. It is preferred that the ball clay in the slurry be comprised of from about 53 to about 62 weight percent of silica and from about 34 to about 35 weight percent of alumina. In a more preferred embodiment, the ball clay is comprised of from about 24 to about 32 percent of alumina.

The amount of silica and alumina in the ball clay can be determined by the atomic absorption method discussed elsewhere in this specification.

In the ball clay slurry of this invention, the silica/alumina weight is from about 2.0 to about 3.0.

In one preferred embodiment, the ball clay used in this invention is comprised of less than about 2.0 percent of iron oxide, less than about 1.0 percent of calcium oxide(lime), less than about 1.0 percent of magneisum oxide(magnesia), less than about 3.0 percent of potassium oxide(potash), and less than about 3.0 percent of sodium oxide (soda). Each of the aforementioend percentages are by weight of the ball clay in the slurry, dry basis. A.S.T.M. test C-323-56(reapproaved 1980) describes procedures for evaluating the amounts of iron oxide (section 11), calcium oxide (section 14), magnesium oxide (section 15), potassium oxide (section 16), and sodium oxide (section 16) in a clay.

The ball clay/water slurry of this invention preferably has a pH of from about 4.0 to about 9.0. In a more preferred embodiment, the pH of the slurry is from about 4.9 to about 7.0.

In one preferred embodiment, the ball clay used in the clay/water slurry of this invention has a loss on ignition of from about 7 to about 15 percent. The loss on ignition property of a clay may be determined in accordance with A.S.T.M. test C3232-56 (section 8).

In one preferred embodiment, the ball clay used in this invention has a true specific gravity of from about 2.4 to about 2.8 and/or an apparent density of from about 2.4 to about 2.6. These terms, and the method by which they are tested, are disclosed on pages 427-425 of R. W. Grimshaw's "The Chemistry and Physics of Clays and Allied Ceramic Materials," Fourth Edition (Wiley-Interscience, New York, 1971), the disclosure of which is hereby incorporated by reference into this specification.

In one embodiment, the refractoriness (P.C.E.) of the ball clay used in the ball clay slurry of this invention is froma bout cone 28 to about cone 34.

The clay/water slurry of this invention may be comprised of one consist of ball clay material. Alternatively, the slurry may be comprised of at least two such consists. In one embodiment, the slurry is comprised of at least three consists of ball clay material.

As used in this specification, and in the prior art, the term "consist" means the particle size distribution of the solid phase of the clay/water slurry. For example, the term "270 mesh×0," when used with reference to a clay/water slurry, indicates clay with a graded size, or consist, of clay particles distributed in the rang eof 270 mesh×0 mesh, or 53 microns×0 microns. The U.S. series mesh sizes are described in "Handbook of Chemistry and Physics," 54th Edition, 1973-1974, CRC Press, Cleveland, Ohio, page 143, "Standard Test Sieves (wire cloth)," the disclosure of which is hereby incorporated by reference into this case.

The ball clay/water slurry of this invention preferably comprises at least two consists of ball clay material dispersed in water and, more preferably, comprises at least three such consists. The process of blending several ball clay/water slurries allows one to produce a final product with desirable casting rate, viscosity, and strength properties.

In one embodiment, at least two ball clay/water slurries are blended together to produce a slurry which contains from about 30 to about 50 percent, by dry weight of ball clay in the slurry, of ball clay particles finer than 0.5 microns. It is more preferred that fro about 35 to about 39 percent of the ball clay particles in the blended slurry be finer than 0.5 microns.

In one embodiment, at least two ball clay/water slurries are blended together to produce a slurry which contains froma bout 50 to about 650 parts per million, by weight of dry ball clay, of soluble sulfate ion.

In one preferred embodiment, at least two ball clay/water slurries are blended together to produce a slurry which contains from about 3.0 to about 20 percent, by weight of dry ball clay in the slurry, of mica.

In one preferred embodiment, at least two ball clay/water slurries are blended together to produce a slurry which contains from about 6 to about 18 percent, by weight of dry ball clay, of one or more montmorillonite minerals.

In one embodiment, at least two ball clay/water slurries are blended together to produce a slurry which contains from about 25 to about 70 percent, by weight of dry clay in the slurry, of one or more kaolinite minerals.

In one preferred embodiment, at least two ball clay/water slurries are blended together to produce a slurry which contains from about 7 to about 40 percent of quartz, by weight of dry ball clay.

In one especially preferred embodiment, at least three ball clay/water slurries are blended together to produce a slurry which contains the above-specified amounts of particles smaller than 0.5 microns, soluble sulfate ion, mica, montmorillonite mineral matter, kaolinite mineral matter, and quartz.

In one embodiment, a digested ball clay/water mixture is provided before a substantial amount of polyelectrolyte is added to the mixture. In general, from about 0.1 to abou 1.0 percent of polyelectrolyte is added to the mixture. At least about 95 percent of the polyelectrolyte to be added is preferably added after the digested ball clay/water mixture has been provided; thus, no more than about five percent of the polyelectrolyte should be added prior to the addition of digesting agent (if digestion is used) and/or the addition of digested organic material. It is preferred that at least about 98 percent of the polyelectrolyte be added after the digested ball clay/water mixture has been provided. It is more preferred that all of the polyelectrolyte be added after the digested ball clay/water mixture has been provided.

In this embodiment, after the digested ball clay/water mixture has been provided, from about 0.1 to about 1.0 percent, by weight of dry clay, or polyelectrolyte, is added to the mixture. It is preferred to add this polyelectrolyte in at least two different charges at at least two different times. In this preferred embodiment, each charge is comprised of at least five weight percent of the total amount of polyelectrolyte to be added to the slurry. It is most preferred that each charge be comprised of at least about 20 weight percent of the total amount of polyelectrolyte to be added to the slurry.

As is readily apparent to those skilled in the art, one can blend two or more slurry fractions so that the blended slurry obtained has specified properties. By way of illustration, one can prepare the slurries described in Table 1 and, after picking any one or more specified target properties, blend the slurries in specified proportions to obtain the desired properties.

The slurries in Table 1 were prepared with the specified amounts of ball clay, water, sodium carbonate, barium carbonate, and polyacrylate. The polyacrylate used was "Colloid 211," a liquid sodium polyacrylate with a solids content of 43 percent sold by the North Chemical Company of Marietta, Ga.

The particle size distributions of the slurries were determined and are presented in Table 1.

TABLE I

| SLURRY IDENTIFICATION | A | B | C | D | E | F |
|---|---|---|---|---|---|---|
| Pounds of ball clay used (wet weight) | 68,620 | 68,620 | 64,360 | 64,360 | 64,000 | 64,000 |
| Pounds of sodium carbonate used | 56 | 56 | 20 | 20 | 20 | 20 |
| Pounds of barium carbonate used | 50 | 40 | 0 | 0 | 50 | 0 |
| Gallons of water used | 2900 | 2950 | 3100 | 3000 | 3500 | 3500 |
| Gallons of polyacrylate used | 28 | 21 | 37 | 37 | 19 | 5 |
| Soluble sulfate ion in slurry (ppm.) (after addition of barium carbonate) | 598 | 433 | 175 | 242 | 450 | 17 |
| Initial viscosity of slurry, cps. (Brookfield) | 202 | 210 | 230 | 240 | 190 | 130 |
| Gallenkamp buildup of slurry, degrees | 56 | 60 | 70 | 56 | 60 | 35 |
| Percent of ball clay particles finer than 0.5 microns | 30 | 28 | 54 | 51 | 33 | 29 |
| Percent of ball clay particles finer than 2.0 microns | 55 | 53 | 71 | 72 | 53 | 54 |
| Specific surface area, square meters per gram | 16.1 | 15.7 | 23.8 | 23.0 | 15.9 | 15.0 |

As is known to those skilled in the art, one can specify one or more of the properties desired in the final slurry and then calculate how much of the various slurries should be blended together to obtain the desired properties. Thus, by way of illustrations, if one desires the final blended slurry to contain about 37.0 percent of its particles finer than 0.5 microns, the slurry blends described in Table 2 will produce the desired results.

TABLE 2

| Slurry Blend Components | Slurry Blend Ratio | Percent of Ball Clay Particles Finer Than 2 Microns | Percent of Ball Clay Particles Finer Than 0.5 Microns | Specific Surface Area of Slurry |
|---|---|---|---|---|
| ACE | 40/25/32 | 56.7 | 36.1 | 17.49 |
| ADE | 40/29/31 | 59.3 | 37.0 | 18.04 |
| ACF | 40/30/30 | 59.5 | 36.9 | 18.08 |
| ADF | 40/34/26 | 60.5 | 36.9 | 18.16 |
| BCE | 40/29/31 | 58.2 | 37.1 | 18.11 |
| BDE | 40/33/27 | 59.3 | 37.9 | 18.16 |
| BCF | 40/34/26 | 59.4 | 37.1 | 18.27 |
| BDF | 40/38/22 | 60.4 | 37.0 | 18.32 |

Thus by way of illustration, one can calculate the slurry blend ratio required to produce a slurry with a specified specific surface are and/or a specified CPFT (percent particles finer than) at 2 microns. As will be apparent to those skilled in the art, many other blend ratios other than those used in Table 1 will give the desired results. For purposes of illustration only, the concentration of one of the blend components was arbitrarily set at 40 percent.

In one embodiment, a ball clay/kaolin clay/water slurry is provided. This slurry is comprised of both ball clay and kaolin clay in a weight/weight ratio of from about 0.11 to about 9 (based on the dry weight of both ball clay and kaolin clay in the slurry). It is preferred that the weight/weight ratio (dry basis) of the ball clay/akolin clay be from about 0.2 to 4.0. It is more preferred that the weight/weight ratio of ball/kaolin clay in the slurry be from about 0.33 to about 3.0. In another embodiment, said weight/weight ratio is from about 0.5 to about 2.0. In the most preferred embodiment, said weight/weight ratio is from about 1.1 to about 2.0

As is well known to those skilled in the art, kaolin is a refractory clay consisting essentially of minerals of the kaolin group which fires to a white or nearly white color; se, e.g., A.S.T.M. C-242-72. The properties of kaoline are discussed, e.g., on pages 402-403 of C. S. Hurlburt, Jr. and C. Klein's "Manual of Mineralogy," 19th edition (John Wiley & Sons, New York, 1977), the disclosure of which is hereby incorporated by reference into this specification.

The ball clay/kaolin clay/water slurry contains from about 50 to about 70 percent (by total weight of slurry) of a mixture of ball clay and kaolin clay, from about 0.01 to about 1.0 percent (by combined weight of ball clay and kaoline clay, dry basis) of organic polyelectrolyte, and from about 50 to about 650 parts per million (by combined weight of ball clay and kaolin clay, dry basis) of soluble sulfate ion.

In addition to organic polyelectrolyte dispersant, the ball clay/kaolin clay/water slurry can also contain from about 0.02 to about 1.0 percent (by combined weight of ball clay and kaolin clay, dry basis) of sodium silicate. When the slurry contains both organic polyelectrolyte and sodium silicate, it is preferred that it contain from about 0.01 to about 0.5 percent (by combined weight of ball clay and kaolin clay, dry basis) of each dispersant, though not necessarily in the same concentrations. In this instance, where the two dispersing agents are in the slurry, the weight/weight ratio of active ingredients for the polyacrylate/sodium silicate is from about 02. to about 5.0 and, preferably, from about 0.33 to about 3.0. It is more preferred that the weight/weight ratio of active ingredient for polyacrylate/silicate be form about 0.5 to about 2.0.

The ball clay/kaolin clay/water slurry is substantially more stable than a kaolin clay/water slurry.

The ball clay/kaolin clay/water slurry can be prepared by blending together one or more ball clay slurries with one or more kaolin clay slurries. The ball clay slurry or slurries used in this process are prepared by the process described in prior portions of this specification, and they are processed in a manner such that they contain from about 0.01 to about 1.0 percent of polyelectrolyte, by dry weight of ball clay. The kaolin slurry or slurries used in this process can be prepared by the process described in prior part of this case; alternatively, or additionally, they may be prepared by prior art means well known to those skilled in the art; and these kaolin slurries also are processed so that they contain from about 0.01 to about 1.0 percent of polyelectrolyte, by dry weight of kaolin clay. Each of the ball clay and kaolin clay slurries is characterized separately, and they are then blended together in proportions suitable to obtain a slurry with desired physical properties.

In a preferred embodiment, each ball clay slurry and each kaolin clay slurry used in this blending process is comprised of a consist of clay with a specified particle size distribution such that from about 90 to about 99 percent of the clay particles are smaller than 20 microns, from about 80 to about 98 percent of the clay particles are smaller than about 10 microns, from about 65 to about 95 percent of the clay particles are smaller than 5 microns, from about 45 to about 85 percent of the clay particles are smaller than 2 microns, from about 25 to about 70 percent of the clay particles are smaller than 1 micron, from about 15 to about 50 percent of the clay particles are smaller than 0.5 microns. This particle size distribution is hereinafter referred to as the "kaolin clay particles size distribution." The ball clay slurry contains a consist of ball clay with a particle size distribution such that from about 92 to about 97 percent of the clay particles are smaller than 20 microns, from about 80 to about 92 of the clay particles are smaller than 10 microns, from about 65 to about 85 percent of the clay particles are smaller than 5 microns, from about 53 to about 86 percent of the clay particles are smaller than 2 microns, from about 38 to about 77 percent of the clay particles are smaller than 1 micron, from about 24 to about 64 percent of the clay particles are smaller than 0.5 microns. This latter particle size distribution is hereinafter referred to as the "ball clay particle size distribution."

In one embodiment, a ball clay/ball clay/water slurry is provided. This slurry is identical to the ball clay/kaolin clay/water slurry described hereinabove with the following exceptions: (1) ball clay is substituted for kaolin clay in the slurry, so that the slurry is made from at least two slurries, each of which has a consist of ball clay with a different particle size distribution; (2) one of the ball clay slurries has a particle size distribution identical to the "kaolin clay particle size distribution" described above; and (3) another of the ball clay slurries has a particle size distribution identical to the "ball clay particle size distribution" described above.

The combination of a coarse ball clay consist (the ball clay with the "kaolin clay particle size distribution") and a fine ball clay consist (the ball clay with the "ball clay particle size distribution") produces a stable slurry. Although applicant does not wish to be bound to any particular theory, he believes that the careful control of the particle size distribution of the fine and coarse components allows one to produce a slurry in which the plastic behavior, casting rate and solids loading can be controlled.

In this embodiment, it is preferred that both ball clay slurries used be produced by the process described in other portions of this specification. Thus, both slurries contain from about 0.01 to about 1.0 percent of organic polyelectrolyte. Thus, both slurries may also contain sodium silicate (in which case, the same conditions apply as apply to the ball clay/kaolin/water slurry). Thus the ball clay/ball clay/water slurry is comprised of from about 58 to about 68 percent (by total weight of slurry) of ball clay, from about 0.01 to about 1.0 percent (by total weight of ball clay, dry basis), of organic polyelectrolyte, from about 50 to about 650 parts per million (by total weight of ball clay, dry basis) of soluble sulfate ion and, optionally from about 0.01 to about 0.5 percent of sodium silicate. As is the case with the ball clay/kaolin slurry, when the slurry contains both organic polyelectrolyte and sodium silicate, it is preferred that it contain from about 0.01 to about 0.5 percent (by dry weight of active ingredient, by dry weight of ball clay) of both the polyelectrolyte and sodium silicate.

In one embodiment, the ball clay/water slurry described hereinabove, in addition to containing organic polyelectrolyte, also contains an inorganic electrolyte such as sodium silicate, sodium hexametaphosphate, tetra sodium pyrophosphate and the like. In this embodiment, the slurry contains from about 0.01 to about 0.5 percent (by dry weight of ball clay, dry basis) of the inorganic electrolyte and the organic polyelectrolyte, although not necessarily in the same concentrations of each.

The weight/weight ratio of organic polyelectrolyte/sodium silicate in the slurry is from about 0.05 to about 10 and, preferably, from about 0.1 to about 6.0. In a more preferred embodiment, said weight/weight ratio is from about 0.33 to about 3.0. In another embodiment, said ratio is from about 0.5 to about 2.0.

This ball clay slurry with two dispersants can be prepared in substantial accordance with the process described in another portion of this specification. Thus, for example, after the step of providing the digested ball clay/water slurry, one can add not only the organic polyelectrolyte dispersant but also the sodium silicate dispersant. As is the case with the organic polyelectrolyte dispersant, the sodium silicate dispersant can be added in at least two charges at two different times, wherein each charge of sodium silicate contains at least 5 percent of the total amount of sodium silicate to be added.

Alternatively, or additionally, one can separately prepare two ball clay slurries, one of which contains organic polyelectrolyte, and the other of which contains sodium silicate. Thereafter, one can blend these slurries in proportions suitable to obtain the desired weight/weight ratio of organic polyelectrolyte/sodium silicate.

The clay/water slurry of this invention may be spray dried by means well known to those skilled in the art to produce a spray-dried clay comprised of from about 50 to about 650 parts per million of soluble sulfate ion and from about 0.01 to about 1.0 percent by weight of organic polyelectrolyte. Thus, e.g., the spray drying technology disclosed in K. Master's "Spray Drying" (Leonard Hill Books, London, 1972) may be used; the disclosure of the Masters book is hereby incorporated by reference into this specification.

The clay/water slurry of this invention may be used to make a porcelain casting slip. The casting slip is prepared by incorporating the ball clay slurry into the slip so that from about 25 to about 39 (by total weight of the casting slip, dry basis) of the ball clay (dry basis) is present). It is preferred that the slip contain from about 28 to about 32 parts of ball clay (dry basis), and it is more preferred that the slip contain from about 29 to about 31 parts of ball clay. In one embodiment, the spray dried ball clay of this invention is incorporated into the casting slip in place of the ball clay/water slurry.

From about 11 to about 25 parts of kaoline (dry weight) are added to the casting slip per 100 part (dry weight) of casting slip. The kaolin can be added dry or in slurry form.

From about 40 to about 55 parts of nonplastics (dry weight) are added to the porcelain casting slip per 100 parts (dry weight) of casting slip. As is well known to those skilled in the art, the term "nonplastic" refers to potassium and sodium aluminosilicates and flint. Suitable nonplastics include, e.g., feldspar, nepheline syenite, feldspathic sand, flint, calcined clays, talc, pyrophyllite, and the like.

In one embodiment, from about 10 to about 20 parts of flint and from about 25 to about 40 parts of feldspar comprise the nonplastic portion of the slip. In this embodiment, it is more preferred that the nonplastic portion comprise about 15 parts of flint and about 35 parts of feldspar.

A sufficient amount of water is mixed with the ball clay, kaolin, and nonplastics so that the specific gravity of the casting slip is from about 1.79 to about 1.87. In one embodiment, the specific gravity of the casting slip is about 1.836.

The clay slip prepared as described above can be slip cast by means well known to those skilled in the art. As is known to those skilled in the art, slip casting is a forming process in which a powdered material is suspended stably in a suitably liquid vehicle, and the resulting slurry poured into an absorbent mold. The mold draws off sufficient vehicle to render the casting strong enough for handling. The ware so formed may then be dried and fired.

The casting slip produced from the any of the clay/water slurries of this invention possess some unexpected, beneficial properties. When a castings lip made from a prior art slurry (which, e.g., consists essentially of sodium silicate) is compared with a casting slip made form the slurry of this invention at the same casting rate, the latter casting slip will unexpectedly have superior drain properties, strength, trim, and workability properties, it will exhibit greater plastic strength; it will have fewer cracks after being trimmed; and it will have fewer defects.

The separation which often occurs in the center of the solid cast section with casting slips made from prior art slurries does not occur as much with casting slips made from the slurry of this invention. Although applicant does not wish to be bound to any theory, he believes;

1. The use of the slurry of this invention produces a cast product with substantially greater homogeneity than that possessed by prior art cast products.

2. In general, after a casting slip has been prepared, it is aged by being allowed to stand under ambient conditions and being subjected to minimal agitation from about 2 to about 3 days. Casting slips produced from prior art slurries are unstable after such aging. Casting slips produced from the slurry of this invention are stable, their viscosities remaining substantially the same after aging.

3. Another advantage of the casting slip produced with the slurry of this case is that it supports only minimal bacterial growth. With casting slips made from prior art slurries, after about eight days there is a substantial, noticeable increase in both viscosity and odor. With casting slips made from the slurry of this invention, however, after eight days, there is no substantial increase in viscosity and there is no noticeable odor.

4. In casting slip practice, the core of the cast is first removed and the cast body is exposed to air so that it can "firm" before the sides of the cast are removed. Firming occurs faster with the casting slip made from the slurry of this invention than with the slurries of the prior art.

5. In casting slip practice, the interior of the cast is often dusted with a mold release agent (such as talc, flint, feldspar, mica, and the like) so that, after the body has been cast, release from the mold will be facilitated. The casting slip made from the slurry of this invention released more readily than casting slips made from prior art ball clay slurries; and the mold life of molds cast with the former casting slip is frequently longer than the mold life of molds cast with the latter slips.

The cast body made from the casting slip is dried by means well known to those skilled in the art. In general, the body is dried until it is "bone dry", i.e., until it contain 0 percent moisture.

The dried body is finished by conventional means. Thus, e.g., it is sprayed with glaze, dried for a short period, and fired. Thus, e.g., the firing methods discussed at pages 113-144 of W. D. Kingery's "Ceramic Fabrication Processes" (John Wiley & Sons, Inc., New York, 1958) can be used; the disclosure of the Kingery book is hereby incorporated by reference into this specification.

The fired body produced from a casting slip made with the ball clay slurry of this invention unexpectedly has fewer glaze defects and fewer cracks than the fired body produced from a casting slip made with a prior art ball clay (which contains conventional deflocculands such as soda ash, sodium hydroxide, sodium silicate and sodium phosphates in combination or separately.

The following examples are presented to illustrate the claimed invention but are not to be deemed limitative thereof. Unless otherwise specified, all parts are by weight and all temperatures are in degrees centigrade.

In each of examples 1-5, an experiment is described in which (1) ball clay, water and sodium carbonate are mixed in a blunger, (2) after all of the ball clay had been added to the blunger and mixed with the other ingredients, 600 gallons of additional water were then also added, and (3) a liquid sodium polyacrylate with a solids content of 43 percent sold by North Chemical Company of Marietta, Ga. as "Colloid 221" was used.

EXAMPLE 1

The clay used in this example is a lignitic coarse ball clay called "Bandy Black" which is described elsewhere in this specification. It contained 34 percent (by total weight of dry ball clay) of particles finer than 0.5 microns and about 1,300 parts per million (by total weight of dry ball clay) of soluble sulfate ion. The clay contained 17 percent moisture.

2,649 gallons of hot water (at a temperature of 170 degrees Fahrenheit) were charged to a 7000 gallon blunger. 34 pounds of sodium carbonate and 121 pounds of barium carbonate were mixed with 30 gallons of water, and this mixture was then added to the hot water to the blunger.

22,196 pounds of the Bandy Black clay were then added to the mixture in the blunger over a period of 13 minutes while the blunger was blunging. Thereafter, clay addition ceased temporarily while the blunging continued for a period of 7 minutes.

After blunging for 7 minutes without clay addition, a second portion of clay—in an amount of 22,192 pounds of Bandy Black ball clay—was added to the mixture in the blunger over a period of 17 minutes while the blunger was blunging. Thereafter, the clay addition ceased temporarily while the blunging continued for 10 minutes.

After blunging for 10 minutes without clay addition, a third portion of clay—in the amount of 22,192 pounds of Bandy Black—was added to the mixture over a period of 13 minutes. During this clay addition, two two-gallon portions of a 43 percent solution of sodium polyacrylate were added at the 10 and 13 minute marks. Thereafter, blunging continued, and additional two-gallon doses of polyacrylate were added at the 21, 29, 62, 77 and 85 minutes marks (as calculated from the beginning of the addition of the third clay portion).

The initial Gallenkamp viscosity of this slurry was evaluated—it was 280. The six-minute Gallenkamp viscosity was 144.

EXAMPLE 2

The clay used in this example is a non-lignitic coarse clay called "HC-5", which is discussed elsewhere in this specification. It contained 32 percent (by total weight of dry clay) of particles finer than 0.5 microns and 1,035 parts per million (by total weight of dry clay) of soluble sulfate ion. The clay contained 18 percent moisture.

2,645 gallons of hot water (at 170 degrees Fahrenheit) were charged to a 7,000 gallon blunger. 20 pounds of sodium carbonate and 100 pounds of barium carbonate were mixed with 30 gallons of water, and this mixture was added to the hot water in the blunger.

22,768 pounds of the HC-5 clay were added to the mixture in the blunger over a period of 12 minutes while the blunger was blunging. Thereafter, clay addition ceased while the blunging continued for 10 minutes.

After blunging for 10 minutes without clay addition, a second portion of the clay—in the amount of 22,766 pounds—was added to the mixture in the blunger over a period of 11 minutes. Thereafter, the clay addition ceased temporarily for a period of ten minutes; during this ten minute period, two two-gallon portions of a 43 percent solution of sodium polyacrylate were added at the 2 minute mark.

After blunging for ten minutes without clay addition, a third portion of HC-5 clay—in the amount of 22,766 pounds—was added to the mixture over a period of 14 minutes. During this clay addition, two two-gallon doses of the polyacrylate were added at both the eight minute mark and the 12 minute mark.

Blunging continued after the third clay addition for a period of 84 minutes. During this time, two-gallon portions of polyacrylate were added to the 9, 25, and 82 minute marks.

The initial Gallenkamp viscosity of this slurry was 324. The six-minute Gallenkamp viscosity was 280.

EXAMPLE 3

The clay used in this example was a lignitic fine clay called "C&C." This clay contained 62 percent (by total weight of dry clay) of particles finer than 0.5 microns and about 152 parts per million (by total weight of dry clay) of soluble sulfate ion. The clay contained 18.6 percent of moisture.

2,351 gallons of hot water, at a temperature of 170 degrees Fahrenheit, were charged to a 7,000 gallon blunger. 20 pounds of sodium carbonate were mixed with 30 gallons of water, and this mixture was then added to the blunger.

23,580 pounds of the C&C clay were added to the mixture in the blunger over a period of 16 minutes. Thereafter, the clay addition ceased temporarily while the blunging continued for a period of ten minutes.

After blunging for ten minutes without clay addition, a second portion of C&C clay—in the amount of 23,580 pounds—was added to the mixture in the blunger over a period of 16 minutes. During this addition, three gallons of a 43 percent solution of sodium polyacrylate were added at the ten minute mark. After the 16-minute clay addition period, clay addition ceased and blunging continued for a period of 10 minutes. During this 10 minute period, one two-gallon portion of polyacrylate were added at the 1 minute mark, and one three-gallon portion of the polyacrylate was added at the 7 minute mark.

After blunging for ten minutes without clay addition, a third portion of the C&C clay—in the amount of 23,580 pounds—was added to the mixture in the blunger over a period of 18 minutes. During this 18-minute period, three three-gallon portions of polyacrylate were added at the 5, 9, and 13 minute marks. Thereafter, addition of clay ceased temporarily and blunging continued 85 minute. During this 85 minute period, polyacrylate was added at the 1 minute mark (3 gallons added) and the 7 minute mark (2 gallons added).

The initial Gallenkamp viscosity of this slurry was 330. The six minute Gallenkamp viscosity was 298.

EXAMPLE 4

50 parts (by weight) of the slurry of example 1 were mixed with 20 parts (by weight) of the slurry of example 2 and 30 parts (by weight) of the slurry of example 3 in a blending tank for about 48 hours; during this time, the slurries were stirred slowly and the mixture was maintained at a temperature of 108 degrees Fahrenheit.

The blended slurry obtained had an initial Gallenkamp viscosity of 341, and a six minute Gallenkamp viscosity of 309. The blended slurry contained 329 parts per million (by weight of dry ball clay) of soluble sulfate ion, and 38 percent of its particles (by weight of dry ball clay) were finer than 0.5 microns. The transmission of the slurry was 76%.

EXAMPLE 5

A 70%/30% kaolin/water slurry was prepared by mixing 985.6 grams of kaolin with 422.4 grams of water. 2,958 grams (dry weight) sodium polyacrylate ("Colloid 211") dispersant was added to the slurry.

A ball clay/water/polyacrylate slurry was made in substantial accordance with the procedure of EXAM- PLE 4. 2,459 grams of this ball clay slurry were mixed with 1,408 grams of the kaolin slurry in a Lightning Mixer to produce a 60/40 weight/weight mixture of ball clay/kaolin (dry weight).

The ball clay/kaolin slurry had an initial Gallenkamp viscosity of 343 degrees, a 6 minute Gallenkamp viscosity of 317 degrees, a specific gravity of 1.667, a percent transmission of 81%, a modulus of rupture of 556, a specific surface area of 12.95 square meters per gram, and a Baroid casting rate of 42.2 grams. This slurry contained 282 parts per million (by combined weight of ball clay and kaolin clay, dry basis) of soluble sulfate ion. The particle size distribution of the slurry was such that 30 percent (by weight) of the clay particles in the slurry were smaller than 0.5 microns.

EXAMPLES 6–9

In substantial accordance with the procedure of EXAMPLES 1–4, a blended slurry (EXAMPLE 9) was prepared from three other ball clay/water slurries (of EXAMPLES 6, 7 and 8).

EXAMPLE 8

The clay used in this example was a lignitic coarse ball clay called "Bandy Black" which is described elsewhere in this specification. The clay contained 27 percent (by total weight of dry ball clay) of particles finer than 0.5 microns and about 850 parts per million (by total weight of dry ball clay) of soluble sulfate ion. The clay contained about 18 percent of moisture, as delivered to the slurry plant; the 68,620 pounds of moist clay was used in this EXAMPLE correspond to 56,268 pounds of dry clay.

3,000 gallons of water at a temperature of 170 degrees Fahrenheit were charged to a 7,000 gallon blunger. 56 pounds of sodium carbonate and 50 pounds of barium carbonate were mixed with 30 gallons of water, and this mixture was then added to the hot water in the blunger.

22,800 pounds of the Bandy Black clay were then added to the mixture in the blunger over a period of 13 minutes while the blunger was blunging. Thereafter, clay addition ceased temporarily while the blunging continued for a period of 7 minutes.

After blunging for 7 minutes without clay addition, a second portion of the clay—in an amount of 22,800 pounds of Bandy Black ball clay—was added to the mixture in the blunger over a period of 18 minutes while the blunger was blunging. Thereafter, the clay addition ceased temporarily while the blunging continued for 10 minutes.

After blunging for 10 minutes without clay addition, a third portion of clay—in the amount of 23,020 pounds of Bandy Black clay—was added to the mixture over a period of 13 minutes. During this clay addition, four one-gallon portions of a 43 percent of sodium polyacrylate ("Colloid 211") were added at the 13, 14, 16, 19, 21, and 24 minute intervals (as calculated from the end of the addition of the third clay portion).

The initial Gallenkamp viscosity of the slurry of this EXAMPLE was 332. The six-minute Gallenkamp viscosity was 278.

EXAMPLE 7

The clay used in this EXAMPLE is a non-lignitic coarse clay called "HC-5," which is discussed elsewhere in this specification. It contained 33 percent (by total weight of dry clay) of particles finer than 0.5 microns and 600 parts per million (by total weight of dry clay) of soluble sulfate ion. The clay contained 12.5 percent moisture.

3,500 gallons of water at 170 degrees Fahrenheit were charged to a 7000 gallon blunger. 20 pounds of sodium carbonate and 50 pounds of barium carbonate were mixed with 30 gallons of water, and this mixture was added to the hot water in the blunger.

64,000 pounds of the HC-5 clay were added to the mixture in the blunger over a period of 42 minutes while the blunger was blunging. During this clay addition, four-two-gallon doses of the polyacrylate were added at the 30, 32, 36, and 40 minute marks.

Blunging continued after the clay addition for a period of 44 minutes. During this time, two-gallon portions of polyacrylate were added at the 12, 15, 20, 28, and 36 minute marks, and a one-gallon portion was added at the 40 minute mark (as calculated from the end of the clay addition).

The initial Gallenkamp viscosity of the slurry was 318. The six-minute Gallenkamp viscosity was 240.

EXAMPLE 8

The clay used in this EXAMPLE was a lignitic fine clay called "C & C." This clay contained 50 percent (by total weight of dry clay) of particles finer than 0.5 microns and about 253 parts per million (by total weight of dry clay) of soluble sulfate ion. The clay contained 16 percent of moisture.

2,800 gallons of hot water, at a temperature of 170 degrees Fahrenheit, were charged to a 7000 gallon blunger. 20 pounds of sodium carbonate were mixed with 30 gallons of water and this mixture was then added to the blunger.

64,360 pounds of the C&C clay were added to the mixture in the blunger over a period of 40 minutes. Thereafter, clay addition ceased and blunging continued 38 minutes. During this time period, 4 gallons of sodium polyacrylate were added at the 6 minute mark. Two gallon portions of sodium polyacrylate were added at th 10, 13, 16, 19, 22, 24, 28, and 30 minute marks. One gallon of polyacrylate as added at the 34 minute mark.

The initial Gallenkamp viscosity of the slurry was 343. The six minute Gallenkamp viscosity was 336.

EXAMPLE 9

Portions of each of the slurries of EXAMPLES 6, 7, and 8 were blended to produce the slurry of EXAMPLE 9. Forty parts by weight of the slurry of EXAMPLE 6 were blended with 41.8 parts by weight of the slurry of EXAMPLE 7 and 18.2 parts by weight of the slurry of EXAMPLE 8.

Each of the slurries of EXAMPLES 6, 7, 8, and 9 were analyzed for soluble sulfate ion content, initial Brookfield viscosity at 100 rpm., flow index, settling index, casting rate, time 0 viscosities at 5 minutes, 10 minutes, and 20 minutes, 4 day viscosity at 20 minutes, dry modulus of rupture, percent transmission, percent particles finer than (CPFT) at 5 microns, 2 microns, and 0.5 microns, and specific surface area. The results are presented in Table 3.

TABLE 3

| EXAMPLE NO. | 6 | 7 | 8 | 9 |
|---|---|---|---|---|
| Soluble sulfate content, ppm. | 670 | 390 | 253 | 473 |
| Initial viscosity, 100 rpm. | 188 | 151 | 237 | 140 |

TABLE 3-continued

| EXAMPLE NO. | 6 | 7 | 8 | 9 |
|---|---|---|---|---|
| Flow index, seconds | 29.2 | 35.6 | 21.0 | 21.7 |
| Settling Index | 1.0 | 0.95 | 1.0 | 0.98 |
| Casting rate, grams/hour | 43.7 | 56.8 | 25.7 | 34.4 |
| TIME 0 VISCOSITIES, cps. | | | | |
| 5 minutes | 4200 | 6000 | 3300 | 2600 |
| 10 minutes | 5160 | 7160 | 4080 | 3900 |
| 20 minutes | 5700 | 8360 | 5280 | 6400 |
| Difference between 20 minute viscosity at 3 days and 20 minute viscosity at time 0 | 0 | 0 | 560(−) | 300(−) |
| Dry modulus of rupture, p.s.i. | 494 | 292 | 516 | 569 |
| Percent Transmission | 76 | 77 | 81 | 79 |
| CPFT, PERCENT OF THE PARTICLES FINER THAN: | | | | |
| 5 microns | 80 | 72 | 83 | 78 |
| 2 microns | 59 | 56 | 73 | 62 |
| 0.5 microns | 27 | 33 | 50 | 37 |
| Specific surface area, square meters per gram | 15.04 | 16.29 | 22.9 | 18.48 |

Some interesting results are obtained with the experiments of these EXAMPLES. The initial viscosity of the blended slurry of EXAMPLE 9 is lower than the initial viscosity of any of the slurries of EXAMPLES 6, 7, and 8. The dry modulus of rupture of the blended slurry of EXAMPLE 9 is higher than the dry modulus of rutpure of any of the slurries of EXAMPLES 6, 7, and 8. Furthermore, although each of the slurries of EXAMPLES 6, 7, and 8 is unsuitable in at least several respects for use in a casting slip, the blended slurry of EXAMPLE 9 is suitable in every respect.

With regard to the slurry of EXAMPLE 6, the difference between its time 0/10 minute and its time 0/5 minute viscosity is 1,500 centipoise, which is outside of the preferred range of 2,500 to 4,000 centipoise. The dry modulus of rupture of this slurry is 494 psi., which is lower than the 550–700 psi. specification. Furthermore, the specific surface area and the soluble sulfate content properties are also outside of specification.

With regard to the slurry of EXAMPLE 7, the dry modulus of rupture of this body is 292 psi., substantially below the 550–700 specification. The flow index of the slurry is 35.6, higher than the 20–30 specification.

With regard to the slurry of EXAMPLE 8, the casting rate of the slurry is 25.7, below the 30–60 specification. Furthermore, the specific surface area of the slurry is above the 16–21 square meters per gram specification.

Although each of the slurries of EXAMPLES 6, 7, and 8 fails to meet the specifications in one or more different respects, when they are blended together to produce the slurry of EXAMPLE 9 they unexpectedly produce a product which meets the specification in every respect.

Although applicant does not wish to be bound to any particular theory, he believes that one of the reasons the blended slurry of EXAMPLE 9 possesses its unique blend of advantageous properties is that its viscosity due to gellation assymptotically approaches a constant value. It is believed that each of the slurries claimed in this case possesses this property.

COMPARATIVE EXAMPLES 10–89

One prior art reference which is somewhat relevant to applicant's claimed invention is British Pat. No. 1,480,420 of Windle. U.S. Pat. No. 4,061,502 of Windle is the United States counterpart of British No. 1,480,420.

The Windle patents (hereinafter referred to as "Windle") do not completely disclose the identify and properties of the ball clay and the slurries described therein. The experiments of EXAMPLES 10–89 attempt to determine wether the slurries of Windle are comparable to applicant's claimed slurries. However, because Windle is so indefinite, certain assumptions had to be made regarding the Windle slurries.

Windle does not specify the particle size distribution or the specific surface area of the ball clays used in his process, and thus it is unclear to what extent the solids content of the Windle slurries is reduced by screening. In EXAMPLE 1 and 3 of his patent, he prepares slurries comprised of 60 percent, 65 percent, and 70 percent of a "... highly siliceous ball clay from the North Devon deposit...," and he screens these slurries "... through a twin deck vibratory sieve, the top deck being a No. 100 mesh British Standard Sieve (nominal aperture 150 microns) and the lower deck being a No. 200 mesh British Standard sieve (nominal aperture 75 microns)..." Because he does not indicate either the particle size distribution of the slurries he screens or the amount of oversize material retained on the screens, it is unclear what the solids contents are of the screened slurries of these examples.

After Windle prepares his screened slurries, he increases the soluble sulfate ion content of them by "... adding dilute sulphuric acid to the suspension until the pH was reduced to 3.8..." Windle does not disclose how dilute his "... dilute sulphuric acid..." is or how much of it is added to the slurries, and thus it is unclear to what extent the solids contents of the Windle slurries are further reduced by the addition of the sulfuric acid to the slurries.

Windle does, however, disclose the silica, alumina, and carbon contents of the ball clay of his slurries. The untreated ball clay of Windle's EXAMPLE 1 and 3 contained 83 percent silica, 10 percent alumina, and 0.05 percent of carbon; and the treated ball clay of these EXAMPLES contained 76 percent of silica, 14 percent of alumina, and 0.13 percent of carbon. The untreated ball clay of Windle's EXAMPLES 2 and 4 contained 42 percent of silica, 30 percent of alumina, and 9.6 percent of carbon; and the treated ball clay of these EXAMPLES contained 43 percent of silica, 31 percent of alumina, and 5.8 percent of carbon.

In order to maximize the possibility that the slurries of EXAMPLES 10–89 would have properties comparable to those of applicant's claimed slurry, it was assumed that the Windle slurries after screening had solids contents of from about 60 to about 70 percent; and the slurries of EXAMPLES 10–89, which represented applicant's attempt to prepare the Windle slurries, were made with solids contents of from about 60 to about 70 percent.

EXAMPLE 10 discusses an experiment in which applicant prepared a ball clay which, to the best of his knowledge, information, and belief, was as comparable as possible to the ball clay disclosed in EXAMPLES 1 and 3 of Windle. EXAMPLE 11 discusses an experiment in which applicant prepared a ball clay which, to the best of his knowledge, information, and belief, was as comparable as possible to the ball clay disclosed in EXAMPLES 2 and 4 of Windle.

EXAMPLE 10

The ball clay used in EXAMPLE 1 and 3 of British Pat. No. 1,480,420 contained 83 percent of silica, 10 percent of alumina, and 0.05 percent of carbon. Applicant evaluated all of the ball clays readily available to his employer, the H. C. Spinks Clay Company Inc., and he also evaluated all clays marketed from the Mississippi/Tennessee River valleys (where all ball clays in the United States originate); and he chose that ball clay which appeared to have properties to those possessed by the ball clay used in EXAMPLES 1 and 3 of British Pat. No. 1,480,420. The ball clay chosen was a coarse-grained "bottom clay" from the Swaim mine of the H. C. Spinks Clay Company Inc.; this clay contained 62.0 percent of silica and 22 percent of alumina; and it had a loss on ignition of 7.5 percent.

In order to make the Swaim coarse-grained bottom clay more similar to the clay of Windle's EXAMPLES 1 and 3, 25 percent of commercially available flint ("200 mesh in bags," sold by the Pennsylvania Glass Sand Corporation of Berkeley Springs, W. Va.) was added to the bottom clay so that its silica content was raised to 72 percent. With another sample of the bottom clay, 52 percent of the flint was added so that the silica content of the bottom clay was raised to 82 percent. The bottom clays (both modified and unmodified) and the ball clay of EXAMPLES 1 and 3 of Windle had the following chemical compositions:

|  | Ball Clay of Windle's Examples 1 and 3 | Swaim bottom clays, modified and unmodified | | |
|---|---|---|---|---|
| Silica content, percent | 83 | 62 | 72 | 82 |
| Alumina content, percent | 10 | 22 | 17.6 | 14.6 |
| Carbonaceous content, % | 0.05 | 0.90 | 0.72 | 0.60 | the increase in the amount of silica in the "bottom clay" lowered the percentage of alumina in the clay.

Because it is not known from the Windle patents the precise amount of sulfuric acid used, and therefore the sulfates content of the Windle slurries, a range of sulfates was added to the sets of EXAMPLES to cover the range of sulfates comprehended in this application. For example, in table 4, EXAMPLES 14–22 show increasing sulfate concentrations of the same slurry. There is no clear basis in Windle that the slurries he discloses contain soluble sulfate ion within the range claimed by applicant. However, some assumption about sulfate content had to be made; and the assumption that was most disadvantageous to applicant—that the sulfate content of Windle's screened and titrated slurries were comparable to those in applicant's slurries—was made for the purpose of these experiments.

EXAMPLE 11

The ball clay used in EXAMPLES 2 and 4 of British Patent No. 1,480,420 contained 42 percent of silica, 30 percent of alumina, and 9.6 percent of carbon. Applicant evaluated all the ball clays readily available to his employer, the H.C. Spinks Company Inc., in addition to all other clays marketed from the Mississippi/Tennessee River valleys; and he chose that ball clay which appeared to have properties most comparable to the properties of the ball clay used in EXAMPLES 2 and 4 of the Windle patents. The ball clay chosen was a clay from the Dill mine of the H.C. Spinks Clay Company Inc. which contained 45 percent of silica, 38 percent of alumina, and 0.6 percent of carbonaceous matter. This clay is often referred to as "Carroll clay."

In order to make the Carroll clay more similar to the ball clay of EXAMPLES 2 and 4 of Windle, a sufficient amount of lignite was mixed with the clay so that its carbonaceous content was raised 5 percent and 10 percent, respectively. One form of lignite chosen was "C&C lignite," and slurries made with clay comprised of this lignite are hereinafter referred to as "C & C slurry." Another form of lignite was "Bandy lignite," and the slurries made with clay comprised of this form of lignite are hereinafter referred to as "Bandy slurry." The C&C lignite was obtained from the Swaim mine of the H.C. Spinks Clay Company Inc. The Bandy lignite was obtained by screening a clay mined from the Warman mine of the H.C. Spinks Clay Company Inc.

The modified Carroll clays and the ball clays of EXAMPLES 2 and 4 of Windle had the following chemical compositions:

|  | Ball clay of Examples 2 and 4 of Windle | Modified Carroll Clays | |
|---|---|---|---|
|  |  | 10% lignite addition | 5% lignite addition |
| Silica content, percent | 42 | 41 | 43 |
| Alumina content, percent | 30 | 35 | 36 |
| Carbonaceous content, % | 9.6 | 10 | 5 |

EXAMPLE 12

In an attempt to make 60 percent and 70 percent slurries from the Swaim bottom clays of EXAMPLE 10, 1,000 grams of each of such bottom clays were each mixed with 7.7 grams of liquid sodium polyacrylate with a solids content of 43 percent (sold by the North Chemical Company of Marietta, Georgia as "Colloid 211"), 1.0 gram of soda ash, 436 grams of water (for the 70 percent slurry), and 667 grams of water (for the 60 percent slurry). Each of these slurries was mixed with a Lightning V-7 Mixer.

The 60 percent and 70 percent slurries were not screened to remove oversize minerals because the added silica settled out of the slurry too rapidly and plugged the screen. In an earlier set of experiments, attempts to screen comparable slurries reduced the solids contents of the slurries below the ranges desired.

EXAMPLE 13

In an attempt to make 60 percent and 70 percent slurries from each of the modified Carroll clays of EXAMPLE 11, 1,000 grams of each of these clays were each mixed with 7.7 grams of "Colloid 211" and 1.0 gram of soda ash. Sufficient water was added to make, for each clay, one 60 percent slurry and one 70 percent slurry. The slurries were mixed in a Lightning V-7 Mixer.

EXAMPLES 14–89

In these EXAMPLES, the slurries made in EXAMPLES 12 and 13 wee evaluated. The results of these experiments are presented in Tables 4, 5, 6, 7, 8, 9, 10, 11, 12, and 13.

In these Tables, any test result marked with an asterisk (*) indicates that, for the specified test, the slurry failed to meet specifications. With regard to the gel viscosity tests, unless the slurry met each and every gel viscosity specification (including, e.g., having the difference between its 20 minute viscosity and its 10 minute or 5 minute viscosity be within the preferred, specified ranges), all the gel viscosity results were marked with an asterisk.

In the Tables, a code is used for each experiment. The first letter of the code, S or C, refers to either the Swaim coarse bottom clay or the Carroll clay. The first number in the code, 60 or 70, refers to the solids content of the slurry.

EXAMPLES 14-22 describe the evaluations of slurries made in EXAMPLE 12 from the Swaim coarse-grained bottom clay which contained 60 percent of solids. In EXAMPLES 14 and 15, the clay slurries made from ball clay containing 62 percent of silica were tested. In EXAMPLES 16, 17, 18, and 19, the clay slurries made from ball clay containing 72 percent of silica were tested. In EXAMPLES 20, 21, and 22, the clay slurries made from ball clay containing 82 percent of silica were tested.

In EXAMPLES 23-32, the slurries made in EXAMPLE 12 from the Swaim coarse-grained bottom clay which contained 70 percent of solids were tested. In the code for this eries of experiments, the first letter ("S") refers to the Swaim coarse bottom clay, the second number ("70") refers to the solids content, and the third number ("62," "72," or "82") refers to the silica content.

In EXAMPLES 33-50, the slurries made in EXAMPLE 13 from the modified Carroll clay which contained 60 percent of solids and C & C lignite were evaluated. In these EXAMPLES, the first letter of the code ("C") refers to the Carroll clay, the second number ("60") refers to the solids content of the slurry, and the third number ("5" or "10") refers to the amount of C & C lignite in the slurry.

In EXAMPLES 51-62, the slurries made in EXAMPLE 13 from the modified Carroll clay which contained 70 percent of solids and C & C lignite were evaluated. The code for each EXAMPLE indicates whether 5 percent of the lignite ("5 C&C") or 10 percent of the lignite ("10 C&C") were used.

In EXAMPLES 63-75, the slurries made in EXAMPLE 13 from the modified Carroll clay which contained 60 percent of solids an Bandy Black lignite were evaluated. In EXAMPLES 76-89, the slurries made in EXAMPLE 13 from the modified Carroll clay which contained 70 percent of solids and Bandy Black lignite were evaluated. The code for each of these examples indicates whether 5 percent ("5B") or 10 percent ("10B") Bandy Black lignite was used.

TABLE 4

| EXAMPLE NO. | 14 | 15 | 16 | 17 | 18 | 19 | 20 |
|---|---|---|---|---|---|---|---|
| CODE | S, 60, 62 | S, 60, 62 | S, 60, 72 | S, 60, 72 | S, 60, 72 | S, 60, 72 | S, 60, 82 |
| SOLUBLE SULFATES ppm | 487 | 700* | 280 | 376 | 570 | 720* | 390 |
| INITIAL VISCOSITY cps., 100 rpm | 69* | 67* | 50* | 60* | 49* | 55* | 49* |
| FLOW INDEX, sec. | 18.2* | 18.7* | 16.9* | 16.9* | 16.1* | 18.8* | 16.4* |
| SETTLING INDEX | .31* | .40* | .11* | .18* | .16* | .18* | .12* |
| CASTING RATE grams/1 hour | 50.4 | 62.2* | 210.2* | 170.2* | 146.3* | 142.4* | 241.8* |
| GEL VISCOSITY | | | | | | | |
| 5 MINUTES, cps | 100* | 200* | 100* | 100* | 100* | 100* | 100* |
| 10 MINUTES, cps | 100* | 200* | 100* | 100* | 100* | 100* | 100* |
| 20 MINUTES, cps. | 100* | 200* | 100* | 100* | 100* | 100* | 100* |
| DRY MOR, psi. | 880* | Hollow | 297* | 623 Cracked | Hollow | Hollow | 286* |
| TRANSMISSION percent | 1* | 4* | 2* | 2* | 2* | 5* | 3* |

COMMENT(S)
The casting rates in this series of experiments reflect the settling of the powders out of suspension rather than the dewatering of suspensions of stable particles. All the major stability indices are poor.

TABLE 5

| EXAMPLE NO. | 21 | 22 | 23 | 24 | 25 | 26 | 27 | 28 |
|---|---|---|---|---|---|---|---|---|
| CODE | S, 60, 82 | S, 60, 82 | S, 70, 62 | S, 70, 62 | S, 70, 62 | S, 70, 72 | S, 70, 72 | S, 70, 72 |
| SOLUBLE SULFATES ppm | 501 | 720* | 299 | 383 | 392 | 250 | 258 | 365 |
| INITIAL VISCOSITY cps., 100 rpm | 51* | 44* | 260 | 250 | 421 | 269 | 218 | 241 |
| FLOW INDEX, sec. | 17.1* | 16.0* | 38.6* | 39.5* | 52.1* | 31.5* | 28.7 | 45.3* |
| SETTLING | .13* | .13* | .9 | .88* | .93 | .78* | .73* | .69* |
| CASTING RATE grams/1 hour | 209.4* | 234.2* | 35.4 | 74.1* | 37.9 | 45.2 | 53.3 | 41.2 |
| GEL VISCOSITY | | | | | | | | |
| 5 MINUTES, cps. | 100* | 200* | 2000 | 2000 | 3400 | 2400* | 1700* | 2050 |
| 10 MINUTES, cps. | 100* | 200* | 2000* | 2000* | 3400 | 2400 | 1700* | 2050* |
| 20 MINUTES, cps. | 100* | 200* | 2000* | 2000* | 3400* | 2400* | 1700 | 2050* |
| DRY MOR, psi. | 329* Cracked | 307* Cracked | 963* Pinholes | 890* | 948* | 745* | 633 Coarse | 681 Coarse |

TABLE 5-continued

| EXAMPLE NO. | 21 | 22 | 23 | 24 | 25 | 26 | 27 | 28 |
|---|---|---|---|---|---|---|---|---|
| TRANSMISSION, percent | 4* | 3* | 1* | 1* | 1* | 1* | Center 1* | Center 1* |
| COMMENT(S) | | | | | | | | |

TABLE 6

| EXAMPLE NO. | 29 | 30 | 31 | 32 | 33 | 34 | 35 | 36 |
|---|---|---|---|---|---|---|---|---|
| CODE | S, 70, 82 | S, 70, 82 | S, 70, 82 | S, 70, 82 | C, 60, 5 C & C | C, 60, 5 C & C | C, 60, 5 C & C | C, 60, 5 C & C |
| SOLUBLE SULFATES, ppm | 17* | 303 | 500 | 801* | 195 | 393 | 568 | 879* |
| INITIAL VISCOSITY cps., 100 rpm. | 170 | 199 | 160 | 165 | 69* | 65* | 60* | 61* |
| FLOW INDEX, sec. | 23.8 | 24.5 | 23.3 | 22.7 | 16.4* | 16.6* | 16.1* | 17.0 |
| SETTLING INDEX | .35* | .23* | .25* | .39* | .75° | .73° | .79° | .95 |
| CASTING RATE grams/1 hour | 78.8* | 37.8 | 89.8* | 76.6° | 44.5 | 61.6* | 52.0 | 70.8° |
| GEL VISCOSITY | | | | | | | | |
| 5 MINUTES cps. | NA* | 1300 | 420* | 550* | 150* | 100* | 200* | 150* |
| 10 MINUTES, cps. | NA* | 1300* | 420* | 550* | 175* | 100* | 200* | 175* |
| 20 MINUTES, cps. | NA* | 1300* | 420* | 550* | 200* | 100* | 200* | 200* |
| DRY MOR, psi. | 413* | 407* | 410* | 427* | NC | 307* | 323* | 308* |
| TRANSMISSION percent | 1* | 0* | 1* | 1* | 2* | 3* | 6* | 21* |

COMMENT(S)
NA = Not Available
The slurry of Example 33 would not cast.

TABLE 7

| EXAMPLE NO. | 37 | 38 | 39 | 40 | 41 | 42 | 43 | 44 |
|---|---|---|---|---|---|---|---|---|
| CODE | C, 60, 5 C & C | C, 60, 5 C & C | C, 60, 10 C & C | C, 60, 10 C & C | C, 60, 10 C & C | C, 60, 10 C & C | C, 60, 10 C & C | C, 60, 10 C & C |
| SOLUBLE SULFATES ppm. | 942* | 1035* | 307 | 321 | 524 | 524 | 524 | 754* |
| INITIAL VISCOSITY cps., 100 rpm. | 58* | 60* | 61* | 67* | 59* | 61* | 60* | 66* |
| FLOW INDEX, sec. | 16.4* | 18.0* | 16.0* | 17.3* | 16.2* | 16.3* | 16.3* | 17.4* |
| SETTLING INDEX | .93 | 1.0 | .86* | .92 | .86* | .80* | .82* | .87* |
| CASTING RATE grams/1 hour | 55.4 | 66.7* | 52.9 | 70.0* | 54.6 | 57.7 | 55.5 | 62.2* |
| GEL VISCOSITY | | | | | | | | |
| 5 MINUTES cps. | 150* | 200* | 100* | 200* | 200* | 100* | 200* | 200° |
| 10 MINUTES, cps. | 160* | 200* | 150* | 200* | 200* | 100* | 200* | 200* |
| 20 MINUTES, cps. | 175* | 200* | 175* | 200* | 200* | 100* | 200* | 200* |
| DRY MOR, psi. | 290* | 339* | 89* | 76* | 101* | 68* | 99* | 107* |
| TRANSMISSION, percent | 23* | 58* | 7* | 14* | 12* | 16* | 18* | 24* |
| COMMENT(S) | | | | | | | | |

TABLE 8

| EXAMPLE NO. | 45 | 46 | 47 | 48 | 49 | 50 | 51 | 52 |
|---|---|---|---|---|---|---|---|---|
| CODE | C, 60, 10 C & C | C, 60, 10 C & C | C, 60, 10 C & C | C, 60, 10 C & C | C, 60, 10 C & C | C, 60, 10 C & C | C, 70, 5 C & C | C, 70, 5 C & C |
| SOLUBLE SULFATES ppm. | 754* | 796* | 921* | 963* | 984* | 1066* | 299 | 374 |
| INITIAL VISCOSITY cps., 100 rpm. | 57* | 65* | 54* | 67* | 69* | 56* | 263 | 263 |
| FLOW INDEX, | 16.4* | 17.2* | 16.4* | 18.2* | 18.8* | 16.8* | 31.3* | 31.1* |

TABLE 8-continued

| EXAMPLE NO. | 45 | 46 | 47 | 48 | 49 | 50 | 51 | 52 |
|---|---|---|---|---|---|---|---|---|
| sec. | | | | | | | | |
| SETTLING INDEX | .91 | .86* | .95 | .96 | 0.95 | .97 | 1.0 | 0.98 |
| CASTING RATE grams/1 hour | 54.0 | 70.0* | 55.9 | 77.4* | 71.3* | 60.9* | 38.28 | 39.0 |
| GEL VISCOSITY | | | | | | | | |
| 5 MINUTES, cps. | 150* | 200* | 200* | 200* | 300* | 150* | 2400 | 2700* |
| 10 MINUTES, cps. | 200* | 200* | 200* | 300* | 300* | 200* | 2400 | 2700 |
| 20 MINUTES, cps. | 200* | 200* | 200* | 350* | 400* | 200* | 2400* | 2700* |
| DRY MOR, psi. | 98* | 64* | 125* | 149* | 173* | 132* | 538* | 484* |
| TRANSMISSION, percent | 20* | 29* | 29* | 40* | 67 | 30* | 2* | 3* |

COMMENT(S)

TABLE 9

| EXAMPLE NO. | 53 | 54 | 55 | 56 | 57 | 58 | 59 | 60 |
|---|---|---|---|---|---|---|---|---|
| CODE | C, 70, 5 C & C | C, 70, 5 C & C | C, 70, 5 C & C | C, 70, 5 C & C | C, 70, 10 C & C | C, 70, 10 C & C | C, 70, 10 C & C | C, 70, 10 C & C |
| SOLUBLE SULFATES ppm. | 443 | 578 | 743* | 821* | 290 | 427 | 497 | 645 |
| INITIAL VISCOSITY cps., 100 rpm. | 235 | 225 | 278 | 247 | 400 | 423 | 350 | 503 |
| FLOW INDEX, sec. | 30.0 | 35.1* | 82.5* | No Flow* | 51.9* | 56.5* | 172* | 107* |
| SETTLING INDEX | 1.0 | 1.0 | 1.0 | 0.99 | 1.0 | 0.55* | 1.0 | 1.0 |
| CASTING RATE grams/1 hour | 39.4 | 43.2 | 47.8 | 76.1* | 50.6 | 41.6 | 51.1 | 48.3 |
| GEL VISCOSITY | | | | | | | | |
| 5 MINUTES, cps. | 2500 | 2200 | 3500 | 3100* | 3700* | 3500* | 3400 | 5000 |
| 10 MINUTES, cps. | 2600 | 2300 | 4000 | 3200 | 3800 | 3600 | 3600* | 5600 |
| 20 MINUTES, cps. | 2700* | 2400* | 4800 | 3400* | 4000 | 3700 | 3800 | 6700 |
| DRY MOR, psi. | 517* | 463* | 448* | 249* | 443* | 510* | 413* | 476* |
| TRANSMISSION, percent | 6* | 8* | 15* | 20* | 4* | 7* | 11* | 20* |

COMMENT(S)

TABLE 10

| EXAMPLE NO. | 61 | 62 | 63 | 64 | 65 | 66 | 67 | 68 |
|---|---|---|---|---|---|---|---|---|
| CODE | C, 70, 10 C & C | C, 70, 10 C & C | C, 60, 5, B | C, 60, 5, B | C, 60, 5, B | C, 60, 5, B | C, 60, 5 B | C, 60, 5, B |
| SOLUBLE SULFATES, ppm. | 801* | 821* | 251 | 408 | 452 | 524 | 626 | 817* |
| INITIAL VISCOSITY cps., 100 rpm. | EEX* | EEX* | 58* | 57* | 52* | 60* | 60* | 54* |
| FLOW INDEX, sec. | 526* | No Flow* | 17.6* | 17.2* | 16.9* | 16.2* | 16.5* | 16.5* |
| SETTLING INDEX | 1.0 | 1.0 | 0.80* | 0.82* | 0.94 | 0.78* | 0.88* | 0.89* |
| CASTING RATE grams/1 hour | 85.9* | 162.3* | 87.3* | 52.2 | 55.7 | 57.9 | 81.3* | 53.7 |
| GEL VISCOSITY | | | | | | | | |
| 5 MINUTES, cps. | EEX | EEX | 200* | 300* | NA* | NA* | 200* | 200* |
| 10 MINUTES, cps. | EEX | EEX | 200* | 350* | NA* | NA* | 200* | 200* |
| 20 MINUTES, cps. | EEX | EEX | 200* | 400* | NA* | NA* | 200* | 200* |
| DRY MOR, psi. | 316* | 260* | 100* | 88* | 71* | 49* | 28* | 48* |
| TRANSMISSION, | 31* | 37* | 7* | 5* | 8* | 9* | 19* | 15* |

TABLE 10-continued

| EXAMPLE NO. | 61 | 62 | 63 | 64 | 65 | 66 | 67 | 68 |
|---|---|---|---|---|---|---|---|---|
| percent | | | | | | | | |

COMMENT(S)
NA = No Gel
EEX = off the scale (too much gel)

TABLE 11

| EXAMPLE NO. | 69 | 70 | 71 | 73 | 74 | 75 | 76 | 77 |
|---|---|---|---|---|---|---|---|---|
| CODE | C, 60, 5B | C, 60, 10B | C, 60, 10B | C, 60, 10B | C, 60, 10B | C, 60, 10B | C, 70, 5B | C, 70, 5B |
| SOLUBLE SULFATES, ppm | 1035* | 350 | 452 | 510 | 733* | 900* | 1700 | 280 |
| INITIAL VISCOSITY cps., 100 rpm. | 58* | 58* | 62* | 60* | 55* | 95* | 281 | 215 |
| FLOW INDEX, sec. | 16.7* | 16.3* | 22.3 | 16.1* | 16.9* | 16.4* | 42.2* | 27.2 |
| SETTLING INDEX | 0.97 | 0.84* | .90 | .96 | .88* | .95 | 1.0 | 1.0 |
| CASTING RATE grams/1 hour | 66.2* | 69.3* | 71.9* | 69.6* | 75.8* | 593 | 52.2 | 38.7 |
| GEL VISCOSITY | | | | | | | | |
| 5 MINUTES cps. | 200* | NG* | 200* | 200* | 200* | NG* | 2800 | 2800* |
| 10 MINUTES, cps. | 200* | NG* | 200* | 200* | 200* | NG* | 2800 | 2000* |
| 20 MINUTES, cps. | 220* | NG* | 200* | 200* | 200* | NG* | 3000* | 2000* |
| DRY MOR, psi. | 50* | 45* | 73* | 53* | 81* | 98* | 403* | 515* |
| TRANSMISSION, percent | 26* | 12* | 13* | 16* | 26* | 25* | 1* | 1* |

COMMENT(S)
NG = No Gel

TABLE 12

| EXAMPLE NO. | 78 | 79 | 80 | 81 | 82 | 83 | 84 | 85 |
|---|---|---|---|---|---|---|---|---|
| CODE | C, 70, 5B | C, 70, 5B | C, 70, 5B | C, 70, 5B | C, 70, 5B | C, 70 10B | C, 70, 10B | C, 70, 10B |
| SOLUBLE SULFATES ppm. | 470 | 665* | 684* | 723* | 1048* | 215 | 318 | 374 |
| INITIAL VISCOSITY cps., 100 rpm. | 207 | 228 | 245 | 294 | EEX* | 210 | 208 | 235 |
| FLOW INDEX, sec. | 30.0 | 36.9* | 67.6* | 48.7* | No Flow* | 41.6* | 155* | 325* |
| SETTLING INDEX | .98 | 1.0 | 1.0 | 0.98 | 1.0 | .97 | .93 | .99 |
| CASTING RATE grams/1 hour | 41.7 | 44.0 | 75.9* | 59.6 | 116.6* | 57.2 | 53.3 | 61.0* |
| GEL VISCOSITY | | | | | | | | |
| 5 MINUTES, cps. | 2100 | 2200 | 3100 | 3800 | EEX* | 2350 | 2200 | 2600 |
| 10 MINUTES, cps. | 2200 | 2500 | 3200 | 4400 | EEX* | 2350 | 2300 | 2700 |
| 20 MINUTES, cps. | 2200* | 2600* | 3400* | 5600 | EEX* | 2400* | 2350* | 2800* |
| DRY MOR, psi. | 538* | 520* | 172* | 405* | 243* | 187* | 227* | 206* |
| TRANSMISSION percent | 3* | 7* | 11* | 12* | 17* | 10* | 6* | 12* |

COMMENT(S)
EEX = Off The Scale

TABLE 13

| EXAMPLE NO. | 86 | 87 | 88 | 89 |
|---|---|---|---|---|
| CODE | C, 70, 10B | C, 70, 10B | C, 70, 10B | C, 70, 10B |
| SOLUBLE SULFATES ppm. | 421 | 618 | 748* | 821* |
| INITIAL VISCOSITY cps., 100 rpm | 258 | 430 | 282 | EEX* |
| FLOW INDEX, sec. | 323* | >360* | >180* | >60* |
| SETTLING INDEX | .99 | 1.0 | 1.0 | .98 |
| CASTING RATE grams/1 hour | 65.0* | 81.1* | 65.3* | 143.9* |
| GEL VISCOSITY | | | | |

TABLE 13-continued

| EXAMPLE NO. | 86 | 87 | 88 | 89 |
|---|---|---|---|---|
| 5 MINUTES, cps. | 3000 | 5400 | 4200 | EEX* |
| 10 MINUTES, cps. | 3200 | 6400 | 4700 | EEX* |
| 20 MINUTES, cps. | 3300* | 8000* | 5100* | EEX* |
| DRY MOR, psi. | 216* | 167* | 222* | 132* |
| TRANSMISSION percent | 14* | 13* | 9* | 27* |

EEX = Off The Scale

It is to be understood that the foregoing description and EXAMPLES are illustrative only and that changes can be made in the ingredients and in their proportions and in the sequence of combination and process steps as well as other aspects of the invention discussed without departing from the scope of the invention as defined in the following claims.

I claim:

1. A blended, stable ball clay/water slurry, wherein:
   (a) said slurry is comprised of from about 58 to about 68 percent (by total weight) of slurry of ball clay (dry basis) and from about 42 to about 32 percent (by total weight of slurry) of water;
   (b) said slurry has an initial Brookfield 100 rpm viscosity of from about 100 to about 600 centipoise;
   (c) from about 30 to about 45 percent (by weight of dry ball clay) of the particles in said ball clay slurry are smaller than 0.5 microns, from about 53 to about 69 percent of the ball clay slurry particles are smaller than 2 microns, and from about 70 to about 85 percent of the ball clay slurry particles are smaller than 5 microns;
   (d) said ball clay slurry has a specific surface area of from about 16 to about 21 square meters per gram;
   (e) said slurry, when freshly made, has a five-minute gel viscosity at 0.5 revolutions per minute of from about 1,000 to about 10,000 centipoise;
   (f) said slurry, when freshly made, has a ten-minute gel viscosity of from about 2,200 to about 12,000 centipoise;
   (g) said slurry, when freshly made, has a twenty-minute gel viscosity of from about 3,500 to about 14,000 centipoise;
   (h) the difference between the twenty-minute gel viscosity of the slurry and its ten-minute gel viscosity is less than about 3,000 centipoise;
   (i) the difference between the twenty-minute gel viscosity of the slurry and its five-minute gel viscosity is less than about 4,000 centipoise;
   (j) the twenty-minute gel viscosity of a three-day old sample of said ball clay slurry is no more than 50 percent greater than the twenty-minute gel viscosity of the freshly-made slurry and is from about 3,500 to about 14,000 centipoise;
   (k) said ball clay slurry contains from about 0.01 to about 1.0 percent of organic polyelectrolyte (weight of active ingredient, by weight of dry ball clay) wherein said organic polyelectrolyte has a molecular weight of from about 1,400 to about 6,000;
   (l) said ball clay slurry contains from about 50 to about 650 parts per million (by weight of dry ball clay) of soluble sulfate ion;
   (m) said slurry has a settling index of at least about 0.9;
   (n) said slurry has a flow index of from about 20 to about 30 seconds;
   (o) said slurry has a casting rate of from about 30 to about 60 grams after one hour;
   (p) said slurry has a transmission of at least about 60 percent;
   (q) said slurry has a dry modulus of from about 550 to about 700 pounds per square inch;
   (r) said ball clay slurry contains from about 50 to about 65 percent (by weight of dry ball clay) of silica and from about 20 to about 35 percent of alumina; and
   (s) the silica/alumina weight ratio in said ball clay slurry is from about 2.0 to about 3.0.

2. The slurry as recited in claim 1, wherein said slurry is comprised of from about 0.1 to about 6.0 percent of humic substance.

3. The slurry as recited in claim 2, wherein:
   (a) said slurry comprises from about 58 to about 65 percent (by total weight of slurry) of ball clay (dry basis), and
   (b) said organic polyelectrolyte is a polyacrylate.

4. The slurry as recited in claim 3 wherein from about 34 to about 40 percent (by weight of dry ball clay) of the particles in said ball clay are smaller than 0.5 microns, from about 57 to about 62 percent of the ball clay particles are smaller than 2 microns, and from about 74 to about 82 percent of the ball clay particles are smaller than 5 microns.

5. The slurry as recited in claim 4, wherein:
   (a) said slurry is comprised from about 59 to about 61 percent (by total weight of slurry) of ball clay (dry basis),
   (b) said slurry also comprises from about 0.1 to about 0.4 percent (weight of active ingredient, by weight of dry ball clay) of polyacrylate with a molecular weight of from about 2,300 to about 4,300,
   (c) said slurry has a specific surface area of from about 16.5 to about 20 square meters per gram, and
   (d) said slurry is comprised of from about 250 to about 550 parts per million (by weight of dry ball clay) of soluble sulfate ion.

6. The slurry as recited in claim 5, wherein:
   (a) from about 36 to about 28 percent (by weight of dry ball clay) of the particles in said ball clay slurry are smaller than 0.5 microns, from about 59 to about 63 percent of the ball clay slurry particles are smaller than 2 microns, and from about 76 to about 80 percent of the ball clay slurry particles are smaller than 5 microns;

(b) said ball clay slurry has a specific surface area of from about 17 to about 18.5 square meters per gram; and (c) said ball clay slurry comprises from about 350 to about 450 parts per million (by weight of dry ball clay) of soluble sulfate ion.

7. The slurry as recited in claim 6, wherein:

(a) said slurry comprises from about 0.15 to about 0.3 percent (weight of active ingredient by weight of dry ball clay) of polyacrylate with a molecular weight from about 3,000 to about 3,800, and (b) said slurry has a casting rate of from about 34 to about 45 grams per hour.

8. The slurry as recited in claim 7, wherein said polyacrylate has a molecular weight of from about 3,300 to about 3,500.

9. The slurry as recited in claim 8, wherein said slurry has a transmission of at least about 70 percent and a settling index of at least about 0.95.

10. The slurry as recited in claim 9, wherein:

(a) said slurry has a settling index of at least about 0.97, and (b) the flow index of said slurry is about 23 seconds.

* * * * *